United States Patent
An et al.

(10) Patent No.: US 9,671,882 B2
(45) Date of Patent: Jun. 6, 2017

(54) MULTI-TOUCH SCREEN DEVICE

(71) Applicant: RNDPLUS CO., LTD., Goyang-si, Gyeonggi-do (KR)

(72) Inventors: Suk Min An, Seoul (KR); Hong Hee Han, Gwangmyeong-si (KR); Gu Berm Jung, Bucheon-si (KR)

(73) Assignee: RNDPLUS CO., LTD., Goyang-si, Gyeonggi-do (KR)

( * ) Notice: Subject to any disclaimer, the term of this patent is extended or adjusted under 35 U.S.C. 154(b) by 0 days.

(21) Appl. No.: 14/388,237

(22) PCT Filed: Mar. 22, 2013

(86) PCT No.: PCT/KR2013/002382
§ 371 (c)(1),
(2) Date: Sep. 25, 2014

(87) PCT Pub. No.: WO2013/147464
PCT Pub. Date: Oct. 3, 2013

(65) Prior Publication Data
US 2015/0042582 A1    Feb. 12, 2015

(30) Foreign Application Priority Data

Mar. 26, 2012    (KR) .................. 10-2012-0030308

(51) Int. Cl.
*G06F 3/041*    (2006.01)
*G06F 3/042*    (2006.01)

(52) U.S. Cl.
CPC ............ *G06F 3/041* (2013.01); *G06F 3/0421* (2013.01); *G06F 2203/04104* (2013.01)

(58) Field of Classification Search
CPC ...... G06F 3/0421; G06F 3/042; G06F 3/0428; G06F 3/0304; G06F 2203/04104; G06F 3/0423

(Continued)

(56) References Cited

U.S. PATENT DOCUMENTS 6,429,857 B1 *  8/2002  Masters ................ G06F 3/0421
                                                178/18.01
8,339,379 B2 * 12/2012  Goertz ................ G06F 3/0421
                                                345/156

(Continued)

FOREIGN PATENT DOCUMENTS

JP    2011-081740 A    4/2011
JP    2011-096085 A    5/2011

(Continued)

*Primary Examiner* — Michael J Jansen, II
(74) *Attorney, Agent, or Firm* — Novick, Kim & Lee, PLLC; Jae Youn Kim

(57) ABSTRACT

Provided is a multi-touch screen device that may calculate x and y orthogonal coordinates of a touch area even if a receiving/transmitting element is arranged on only one of the x-axis and the y-axis. The receiving/transmitting element is not arranged on both the x-axis and the y-axis so that an infrared ray scans a touch area in a matrix configuration, but an infrared receiving/transmitting element is arranged on only one of the x-axis and y-axis so that one receiving module sequentially scans the touch area using a right-angle scan measurement signal and an oblique-angle scan measurement signal. The multi-touch screen device may decrease the number of receiving/transmitting elements for use and solve a ghost image problem that occurs in a multi-touch operation that uses infrared rays.

6 Claims, 20 Drawing Sheets

(58) Field of Classification Search
USPC .......................................................... 345/173
See application file for complete search history.

(56) References Cited

U.S. PATENT DOCUMENTS

| | | | | |
|---|---|---|---|---|
| 8,350,831 B2* | 1/2013 | Drumm | ................ | G06F 3/0421 345/173 |
| 8,373,679 B2* | 2/2013 | Gepner | ................ | G06F 3/0421 178/18.09 |
| 8,456,449 B2* | 6/2013 | Kim | ................ | G06F 1/3203 178/18.01 |
| 8,605,046 B2* | 12/2013 | Lu | ................ | G06F 3/0428 178/18.01 |
| 8,786,577 B2* | 7/2014 | Takeno | ................ | G06F 3/0421 345/175 |
| 9,158,415 B2* | 10/2015 | Song | ................ | G06F 3/0421 |
| 9,292,132 B2* | 3/2016 | An | ................ | G06F 3/0416 |
| 2002/0067348 A1* | 6/2002 | Masters | ................ | G06F 3/0421 345/175 |
| 2010/0026666 A1* | 2/2010 | Ho | ................ | G06F 3/0421 345/175 |
| 2011/0084939 A1* | 4/2011 | Gepner | ................ | G06F 3/0421 345/175 |
| 2011/0115726 A1* | 5/2011 | Kim | ................ | G06F 1/3203 345/173 |
| 2011/0169780 A1* | 7/2011 | Goertz | ................ | G06F 3/0416 345/175 |
| 2011/0227874 A1* | 9/2011 | Fahraeus | ................ | G06F 3/0421 345/175 |
| 2011/0261020 A1* | 10/2011 | Song | ................ | G06F 3/0421 345/175 |
| 2012/0105377 A1* | 5/2012 | Takeno | ................ | G06F 3/0421 345/175 |
| 2012/0218230 A1* | 8/2012 | Zhao | ................ | G06F 3/0421 345/175 |
| 2013/0127763 A1* | 5/2013 | Gepner | ................ | G06F 3/017 345/173 |
| 2013/0249833 A1* | 9/2013 | Christiansson | ....... | G06F 3/0428 345/173 |

FOREIGN PATENT DOCUMENTS

| | | |
|---|---|---|
| KR | 10-1018397 B1 | 2/2011 |
| KR | 10-2011-0050352 A | 5/2011 |
| KR | 10-2011-0094917 A | 8/2011 |

* cited by examiner

MULTI-TOUCH SCREEN DEVICE

TECHNICAL FIELD

The present invention relates to a multi-touch screen device using infrared light which may calculate X and Y orthogonal coordinates in touch areas even if receiving and transmitting elements are arranged on one of the x-axis and y-axis, and more particularly to a multi-touch screen device in which both a sequential scanning method of receiving modules and a sequential scanning method of transmitting modules are used together or transmitting modules and receiving modules are grouped so that accurate change in touch areas may be recognized from user's sudden operation and a ghost image generated by interference between multi-touch objects is easily removed.

BACKGROUND ART

In general, a general multi-touch screen device using infrared light includes receiving and transmitting elements are arranged on the x-axis and the y-axis and measures orthogonal coordinates of touch objects based on whether or not the touch objects block infrared transmitting signals. It uses the receiving and transmitting elements on both the x-axis and the y-axis and is increasingly used.

Infrared signals are AC signals of several tens to hundreds of kHz, and the magnitude of the infrared signals is measured by averaging AC signals collected according to presence and absence of objects blocking infrared light due to touch after radiation. Such a conventional method restricts sensitivity and an overall reaction rate due to lowering of frequency response of infrared light transmitting and receiving elements by time to average the collected AC signals and high-frequency signals.

In the conventional method, since different light sources operated in transmitting units and receiving units interfere with each other, accurate signal reception of receiving elements is not expected and thus, accurate coordinates may not be calculated.

A conventional large infrared touch screen has a difficulty in accurately sensing touch objects and removing ghost images in momentary composite operation in which several persons simultaneously touch the touch screen in several directions.

Further, in the conventional method, infrared signals are radiated so as to be orthogonal between x-axis and y-axis transmitting and receiving units. If multi-touch in a diagonal direction occurs, ghost images may be generated by interaction between a plurality of different touch areas.

FIG. 20 is a view illustrating an infrared type touch screen device disclosed in Korean Patent No. 10-1018397.

In the touch screen device disclosed in Korean Patent No. 10-1018397, in order to remove ghost images, a first scan control mode is performed and then, if multi-touch is sensed, a second scan control mode is separately performed. In the first scan control mode, the case in that actual multi-touch is not recognized as multi-touch is generated and thus, the touch screen device may malfunction. Further, if multi-touch is recognized after the first scan control mode has been performed, an object judged as a ghost image is removed from the multi-touch by separately performing the second scan control mode. Therefore, if movement of multi-touch is frequently carried out, when new multi-touch is generated while performing the second scan control mode, the first scan control mode with respect to the new multi-touch is not operated and the second scan control mode with respect to the former multi-touch is operated and thus, the new multi-touch may not be normally recognized.

Further, in the touch screen device disclosed in Korean Patent No. 10-1018397, transmitting and receiving elements are arranged on both the x-axis and the y-axis, thus requiring a large number of the transmitting and receiving elements.

DISCLOSURE

Technical Problem

Therefore, the present invention has been made in view of the above problems, and it is an object of the present invention to provide a multi-touch screen device which is normally operated even if receiving and transmitting elements are arranged on one of the x-axis and y-axis.

It is another object of the present invention is to provide a multi-touch screen device which prevents generation of ghost images if multi-touch occurs or easily removes ghost images.

It is another object of the present invention is to provide a multi-touch screen device in which a sequential scanning method of receiving modules and a sequential scanning method of transmitting modules are used together or the receiving modules and transmitting modules are grouped so that, even if a touch position of a user is rapidly changed, the touch position may be accurately recognized It is another object of the present invention is to provide a multi-touch screen device which measures and compensates for optimized touch positions according to characteristics of the multi-touch screen device.

It is yet another object of the present invention is to provide a multi-touch screen device in which units to transmit and receiving touch measurement signals for touch position measurements are optimally arranged.

Technical Solution

In accordance with an aspect of the present invention, the above and other objects can be accomplished by the provision of a multi-touch screen device including x-axis transmitting modules including transmitting elements transmitting touch measurement signals radially to receiving elements being opposite to the transmitting elements, x-axis receiving modules including the receiving elements sequentially receiving the touch measurement signals transmitted by the transmitting elements at right and oblique angles, a controller calculating x and y coordinates of touch areas using only the touch measurement signals received by the x-axis receiving modules, and a touch panel receiving touch input from users.

The controller may calculate the x coordinate of the touch area based on a signal received by the x-axis receiving module corresponding to the touch area obstructing the path of the touch measurement signal transmitted at the right angle from the x-axis transmitting module and calculate the y coordinate of the touch area based on a signal received by the x-axis receiving module corresponding to the touch area obstructing the path of the touch measurement signal transmitted at the oblique angle from the x-axis transmitting module.

Further, the controller may calculate the x coordinates [$x_0(n)$, $x_r(n)$] of the touch area obstructing the paths of the touch measurement signals transmitted at the right and oblique angles based on touch measurement signal measurement values acquired by normalizing the magnitudes of the received touch measurement signals. Among the touch measurement signal measurement values, in case of a value greater than a first reference value $T_{lower}$, it may be judged that there is an obstruction to the path of the touch measurement signal and the x coordinates $[x_0(n), x_t(n)]$ of the touch areas may be determined. Among the touch measurement signal measurement values, in case of a value not greater than the first reference value $T_{lower}$, if the value of W below is not zero, it may be judged that pressing of the touch panel by touch is present, the coordinates $[x_0(n), x_t(n)]$ and diameters d(n) of the touch areas are calculated, and validity of the coordinates satisfying a condition may be confirmed. Here, W=S (the maximum resolution of a screen)/N or M (the number of transmitting elements arranged on the horizontal axis or the vertical axis).

Further, if the $k^{th}$ receiving or transmitting element fails, the measurement value of the $k^{th}$ touch measurement signal may be replaced with the measurement value of the $k-1^{th}$ touch measurement signal, and the transmitting elements may continuously touch measurement signals at the right angle and touch measurement signals at the oblique angle. The receiving elements and the transmitting elements may be alternately arranged on the same axis and perform scanning such that the receiving element on one side and the transmitting element on the other side are opposite to each other and thus form one pair. The receiving elements and the transmitting elements transmit touch signals alternately with adjacent receiving elements and transmitting elements by a designated time interval.

In accordance with another aspect of the present invention, there is provided a multi-touch screen device including transmitting modules including transmitting elements transmitting touch measurement signals, receiving modules including receiving elements receiving the touch measurement signals transmitted by the transmitting elements, a controller calculating coordinates of touch areas using the touch measurement signals received by the receiving modules, and a touch panel receiving touch input from users, wherein a plurality of receiving elements being opposite to one transmitting element at right and oblique angles sequentially scan touch objects toward the transmitting element at right, acute, and obtuse angles or at right, obtuse, and acute angles, and/or a plurality of transmitting elements being opposite to one receiving element at right and oblique angles sequentially scan touch objects toward the receiving element at right, acute, and obtuse angles or at right, obtuse, and acute angles.

In accordance with yet another aspect of the present invention, there is provided a multi-touch screen device comprising including x-axis transmitting module groups including touch measurement signal transmitting modules transmitting radially continued touch measurement signals to x-axis receiving modules, x-axis receiving module groups including at least three receiving modules so that the respective receiving modules simultaneously receive the touch measurement signals, transmitted from the x-axis transmitting module groups, at the positions of right, acute, and obtuse angles, an x-axis transmitting unit driving clock unit providing a driving clock so as to simultaneously drive the x-axis touch measurement signal transmitting modules having the same index in the x-axis transmitting module groups, a controller calculating x and y coordinates of touch areas using only the touch measurement signals received by the x-axis receiving module groups without y-axis transmitting module groups and y-axis receiving module groups, and a touch panel receiving touch input from users.

The controller may calculate the x coordinate of the touch area based on a signal received by the x-axis receiving module group corresponding to the touch area obstructing the path of the touch measurement signal transmitted at the right angle from the x-axis transmitting module group and calculate the y coordinate of the touch area based on a signal received by the x-axis receiving module group corresponding to the touch area obstructing the path of the touch measurement signal transmitted at the acute or obtuse angle from the x-axis transmitting module group.

Advantageous Effects

In the multi-touch screen device having the above-described configuration in accordance with the present invention, even if receiving and transmitting elements are arranged on only one axis and are not arranged on the other axis, X and Y orthogonal coordinates of touch areas may be measured in the same manner as arrangement of receiving and transmitting elements in a matrix and thus, usage of receiving and transmitting elements may be reduced to half, a manufacturing process of the multi-touch screen device may be simplified, and the volume of the multi-touch screen device may be reduced. Further, generation of ghost images during multi-touch in the multi-touch screen device may be prevented.

Since receiving and transmitting modules may be grouped and respective receiving module groups and transmitting module groups simultaneously receive and transmit touch measurement signals, even of a touch position of a user is rapidly changed, the touch position may be accurately recognized.

If the receiving modules sequentially perform scanning at right, acute, and obtuse angles, if the transmitting modules sequentially perform scanning at right, obtuse, and acute angles, or if the above methods are used together, a scan density may be increased and thus, operation of complicated touch objects may be rapidly and accurately sensed and ghost images may be more effectively removed.

Optimized touch positions may be measured and compensated for, units to transmit and receive touch measurement signals are optimally arranged and thus, a multi-touch screen device having high reliability and quality may be provided. Further, if pairs of receiving and transmitting elements are alternately arranged on the same axis, disturbance in measurement due to an infrared light radiation angle when the adjacent pairs simultaneously perform scanning may be prevented and a scan speed may be increased.

DESCRIPTION OF DRAWINGS

The above and other objects, features and other advantages of the present invention will be more clearly understood from the following detailed description taken in conjunction with the accompanying drawings, in which.

BEST MODE

Figure 1:
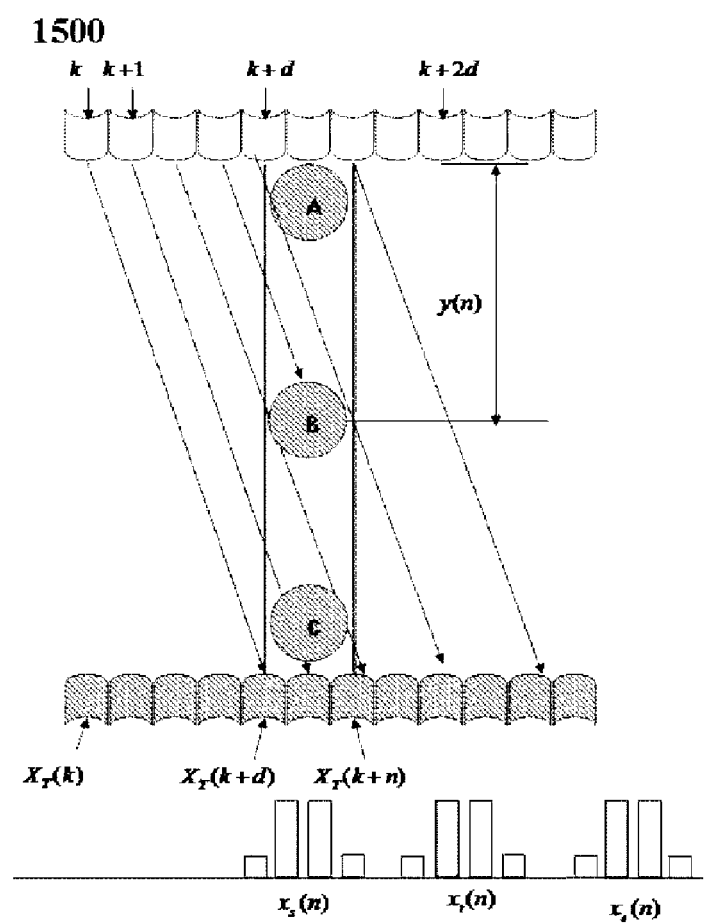
FIG. 1 is a view illustrating a principle of operating a multi-touch screen device in accordance with a first embodiment of the present invention, if receiving and transmitting elements are arranged on one of the x-axis and the y-axis.

Reference will now be made in detail to the preferred embodiments of the present invention, examples of which are illustrated in the accompanying drawings. In the drawings, parts not relating to description of the present invention will be omitted when it may make the subject matter of the present invention rather unclear, and the same or similar elements are denoted by the same reference numerals even though they are depicted in different drawings.

In the description, it will be understood that the term "including" does not mean that other elements may be excluded but means that other elements may be further included unless specifically stated otherwise. Further, it will be understood that the suffixes "group", "module" and "unit" in elements used in the description below means units of treating at least one function or operation and be implemented by hardware, software, or combination of hardware and software.

Hereinafter, a first embodiment of the present invention will be described.

In general, receiving and transmitting elements are arranged on the x-axis and the y-axis and coordinates of a touch area may be recognized by reading coordinates of a crossing point at which a touch obstacle blocks infrared signals from the transmitting elements to the receiving elements. However, the first embodiment of the present invention provides a multi-touch screen device in which receiving and transmitting elements are arranged only on one of the x-axis and the y-axis and orthogonal coordinates of both the x-axis and the y-axis may be calculated.

The transmitting elements are arranged at one side of one axis, i.e., the x-axis, the receiving elements are arranged at the other side of the axis, and one transmitting element radially transmits a touch measurement signal of infrared light toward the receiving element. An object forming a touch area on a touch panel blocks the touch measurement signal and, at this time, X orthogonal coordinates of the touch area may be judged according to presence and absence of a measured value of the receiving element located at the right angle.

Figure 2:
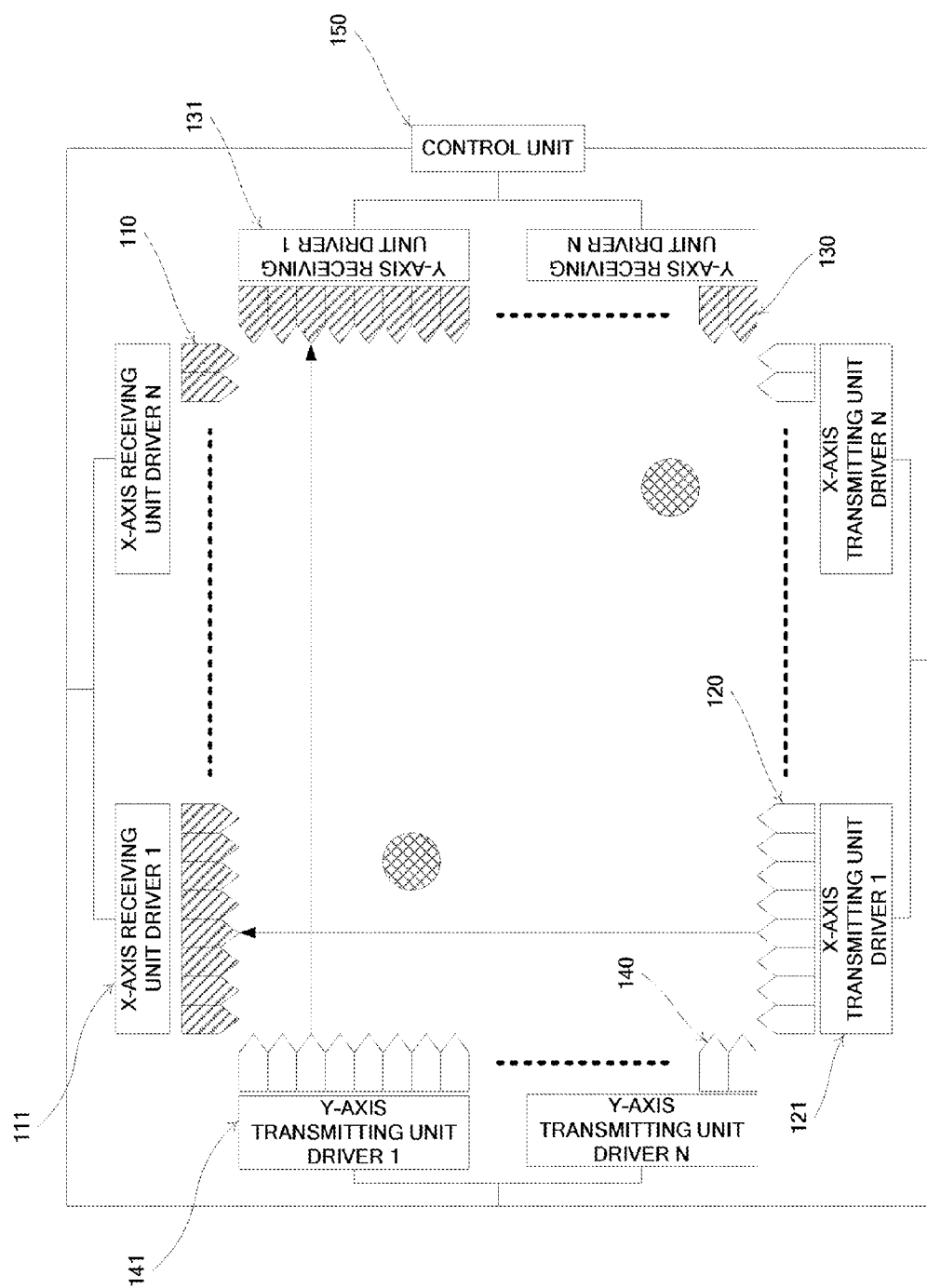
FIG. 2 is a view schematically illustrating the configuration of a multi-touch screen device in accordance with a second embodiment of the present invention.

Although an infrared signal will be exemplarily used as the touch measurement signal, an RF signal or an LED light emitting signal may be used as the touch measurement signal.

x-axis receiving and transmitting modules 110 and 120, x-axis receiving and transmitting module drivers 111 and 121, and a controller 150 in accordance with a second embodiment of the present invention shown in FIG. 2 are applied to the first embodiment of the present invention shown in FIG. 1.

As exemplarily shown in FIG. 2, the x-axis receiving and transmitting modules 110 and 120 may include a designated number of infrared light generators and infrared light receiving elements. The x-axis transmitting module drivers 121 drive touch measurement signal generators arranged on the x-axis shown in FIG. 5 or 6 to radiate touch measurement signals, for example, infrared signals, to a touch panel, and the x-axis receiving module drivers 111 include the x-axis receiving module 110 arranged on the x-axis and drive touch measurement signal receiving elements shown in FIG. 5 or 6 to receive the infrared signals radiated from the x-axis transmitting modules 120.

Hereinafter, a method of deducing Y orthogonal coordinates of a touch area in accordance with the first embodiment of the present invention will be described.

FIG. 1 is a view illustrating a principle of operating a multi-touch screen device in accordance with the present invention, if receiving and transmitting elements are arranged on one of the x-axis and the y-axis.

Receiving and transmitting elements are arranged on the x-axis and receiving and transmitting elements are not arranged on the y-axis. On the other hand, receiving and transmitting elements may be arranged on the y-axis and receiving and transmitting elements may not be arranged on the x-axis. This arrangement is stated for convenience of description and means that receiving and transmitting elements are arranged only one axis. Any arrangement is within the scope of the present invention.

In FIG. 1, receiving elements k, k+1, k+d, and k+2d are sequentially arranged above the x-axis. Further, receiving elements $X_T(k)$, $X_T(k+d)$, . . . , $X_T(k+n)$ are sequentially arranged below the x-axis. Here, d represents the position of a transmitting element corresponding to the position of a receiving element located at the oblique angle which infrared light emitted from the transmitting element k initially reaches, and is a factor determining the magnitude of the oblique angle representing the gradient of transmitted infrared light.

A, B, and C shown in FIG. 1 represent touch areas on the touch screen. One of the touch areas A, B, and C may be selected and touched, or the touch areas A, B, and C may be simultaneously multi-touched.

Next, a process of calculating virtual y-axis orthogonal coordinates [y(n)] using only the receiving and transmitting elements arranged on the x-axis. When a specific transmitting element arranged on the x-axis transmits an infrared touch signal, a plurality of receiving elements arranged at the positions of the x-axis at the right angle, acute angle, and obtuse angle and being opposite to the specific transmitting element sequentially scans the touch signal blocked by a touch object. Of course, the x-axis orthogonal coordinates [x(n)] may be measured using the measurement signal at the right angle, as described above. Hereinafter, a process of measuring an oblique coordinates [$x_t(n)$] generated by the oblique angle touch measurement signal and calculating the virtual y-axis orthogonal coordinates [y(n)] by the controller will be described.

A measurement signal of a transmitting element k is received by a receiving element $X_T(k+d)$ separated from the transmitting element k by k+d and thus, the magnitude of the measurement signal may be measured. When the touch areas A, B, and C are sequentially touched in order of A, B, and C or simultaneously multi-touched on the x-axis, the receiving element located at a position separated from the transmitting element k by k+d receives the oblique angle touch measurement signal. When the oblique angle touch measurement signal is blocked by the touch areas A, B, and C and is not received by the receiving element, the measured position becomes a new x-axis oblique coordinate [$x_t(n)$].

As exemplarily shown in FIG. 1, it may be understood that the x-axis oblique coordinate, generated by the touch area A, B, and C vertically moving along the same x-axis coordinate, becomes the maximum in case of the touch area A and becomes the minimum in the case of the touch area C. That is, it may be easily understood that the x-axis oblique coordinate is in the range between the maximum and the minimum according to movement of the touch area.

In FIG. 1, $x_t(n)$ is an oblique angle infrared light measurement signal with respect to an $n^{th}$ object from an orthogonal touch start point [$x_0(n)$ or $x_s(n)$] of the touch area A, B, or C, and the coordinate thereof is calculated by shielding infrared light using Equation (3) or (4) which will be stated later. The oblique coordinates [$x_t(n)$] acquired by oblique scanning are in linear relations with the y-axis orthogonal coordinates [y(n)]. It may be expressed by Equation A and be calculated from the x-axis coordinates by an equation without measurement of y-axis orthogonal coordinates [y(n)].

$$y(n)=f(x_t(n)-x_0(n))$$ [Equation A]

Here, y(n) represents virtual y-axis orthogonal coordinates calculated from the x-axis coordinates measured from right angle and oblique angle touch measurement signals. $x_0(n)$ represents x-axis orthogonal coordinates of an $n^{th}$ touch object measured using the right angle touch measurement signal. $x_t(n)$ represents x-axis oblique coordinates of the $n^{th}$ touch object measured using the oblique angle touch measurement signal. If an oblique angle transmission signal is scanned at an obtuse angle, $x_t \geq x_0$ and, if the oblique angle transmission signal is scanned at an acute angle, $x_0 \geq x_t$.

The x-axis orthogonal coordinates may be measured by a right angle transmission signal, and the y-axis orthogonal coordinates may be represented by virtual y rectangular coordinates having a function of values acquired by subtracting the x-axis orthogonal coordinates from the x-axis oblique coordinates measured by a oblique angle transmission signal. As a result, the orthogonal coordinates of the $n^{th}$ touch object become [x(n), y(n)].

The calculated y coordinates may be calculated into a general equation, as expressed by Equation B below.

$$y(n)=G \times (x_t(n)-x_0(n))$$ [Equation B]

Here, G is a random constant (or a scaling constant) and is determined by equation $W=G \times (x_e(n)-x_0(n))$.

Here, W is logical resolution of the y-axis (a virtual logical resolution value of coordinates [$x_e(n)$] corresponding the last point of touch due to the touch area A which are the maximum coordinates occurring when the oblique angle transmission signal is generated). That is, in the touch area A, an oblique angle signal touch point corresponding to a random point n is determined as the maximum coordinate W. On the other hand, in the touch area C, the oblique angle signal touch point is determined as $x_t(n)=x_0(n)$ and thus, y(n)=0.

Therefore, a multi-touch screen device normally operated even if transmitting modules are not arranged on the other axis may be provided.

The above calculation and operation process may be applied to the second or third embodiment unless specifically stated otherwise.

Hereinafter, the reason why a ghost image is not generated during multi-touch will be described.

In general, a ghost image generated on a multi-touch screen is generated due to a matrix-type scan structure of infrared light of receiving and transmitting elements arranged on the x-axis and the y-axis. That is, when a plurality of touch areas in a diagonal direction are touched in infrared scan signals transmitted in a matrix type, crossing points at which the touch areas block infrared light are made not only in the actual touch area but also at other positions. It is generated by the matrix type arrangement structure of infrared light transmitted by the receiving transmitting elements in an infrared light scan method. In the first embodiment of the present invention, infrared light transmitted by the receiving and transmitting elements does not scan a touch object in an orthogonal matrix type and thus, a ghost image is not generated. Therefore, the present invention is advantageous in that a ghost image is not generated, the number of used receiving and transmitting elements is greatly reduced, and a manufacturing process of a multi-touch screen device is simplified.

Further, in the first embodiment of the present invention, a touch measurement signal at a right angle and a touch measurement signal at an oblique angle are sequentially scanned. If a $k^{th}$ receiving or transmitting element fails, the measurement value of a $k^{th}$ touch measurement signal is replaced with the measurement value of a $k-1^{th}$ touch measurement signal. The transmitting elements and the receiving elements may be alternately arranged on the same axis and perform scanning. The adjacent receiving elements may alternately receive a touch signal by a designated time interval. Transmitting modules or receiving modules, each of which includes a plurality of transmitting elements or a plurality of receiving elements, or transmitting module groups or receiving module groups, each of which includes a plurality of transmitting modules or a plurality of receiving modules, may be arranged. The respective modules or the groups transmit and receive infrared measurement signals and thus, rapid multi-touch by users may be accurately and rapidly recognized. A detailed description thereof will be given below with reference to the second and third embodiments of the present invention.

Hereinafter, the second embodiment of the present invention will be described.

FIG. 2 is a view schematically illustrating the configuration of a multi-touch screen device in accordance with the second embodiment of the present invention.

A multi-touch input device in accordance with the second embodiment of the present invention includes x-axis receiving and transmitting modules 110 and 120, x-axis receiving and transmitting module drivers 111 and 121, y-axis receiving and transmitting modules 130 and 140, y-axis receiving and transmitting module drivers 131 and 141, and a controller 150.

Figure 5:
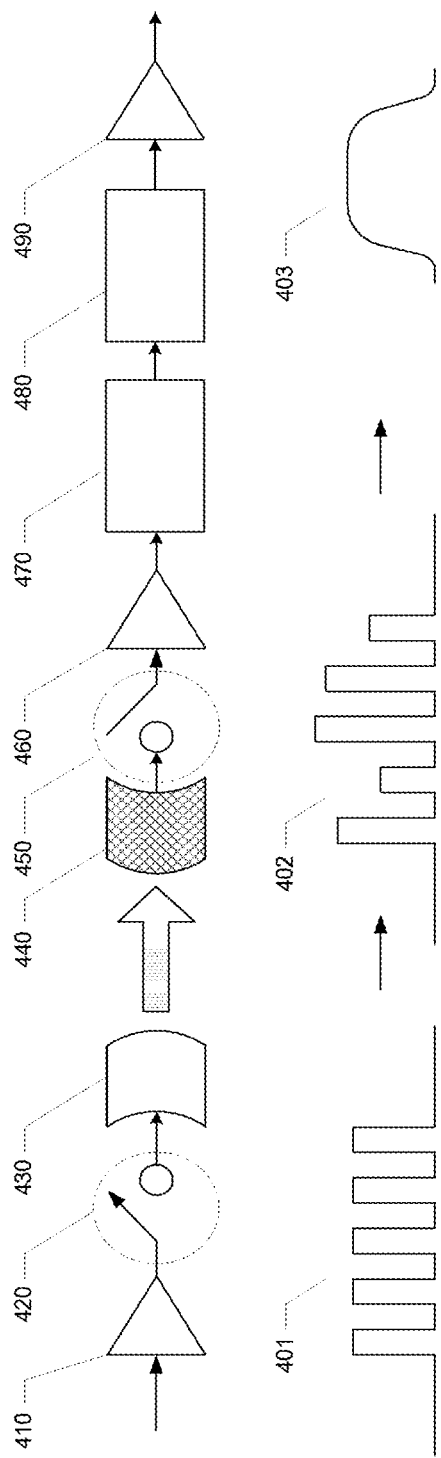
FIG. 5 is a view illustrating an operating process of the multi-touch screen device in accordance with the second embodiment of the present invention.
Figure 6:
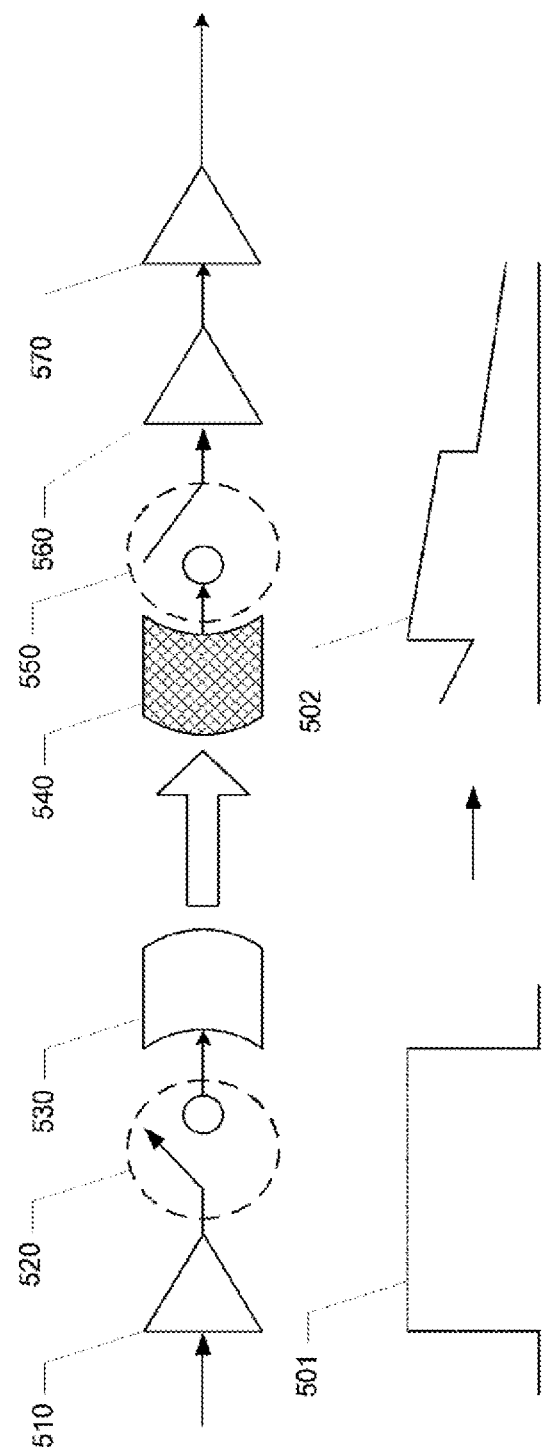
FIG. 6 is another view illustrating an operating process of the multi-touch screen device in accordance with the second embodiment of the present invention.

As exemplarily shown in FIG. 2, the x-axis and y-axis transmitting module drivers 121 and 141 drive touch measurement signal generators arranged on the x-axis and y-axis shown in FIG. 5 or 6 to radiate touch measurement signals, for example, infrared signals, to the touch panel, and the x-axis and y-axis receiving module drivers 111 and 131 include the x-axis and y-axis receiving modules 110 and 130 arranged on the x-axis and the y-axis and drive touch measurement signal receiving elements shown in FIG. 5 or 6 to receive the infrared signals radiated from the x-axis and y-axis transmitting modules 120 and 140 and external signals, such as sunlight.

Although FIG. 2 illustrates the transmitting modules and the receiving modules are opposite to each other, the transmitting modules and the receiving modules may be alternately arranged at both sides.

The controller 150 processes infrared signals received from the x-axis receiving modules 110 and the y-axis receiving modules 130 and thus calculates coordinates of points on the touch panel touched by users. Here, the controller 150 may calculate not only the x-axis and y-axis coordinates of the touch points but also the sizes of the touch points, i.e., the diameters of the touch points.

Figure 3:
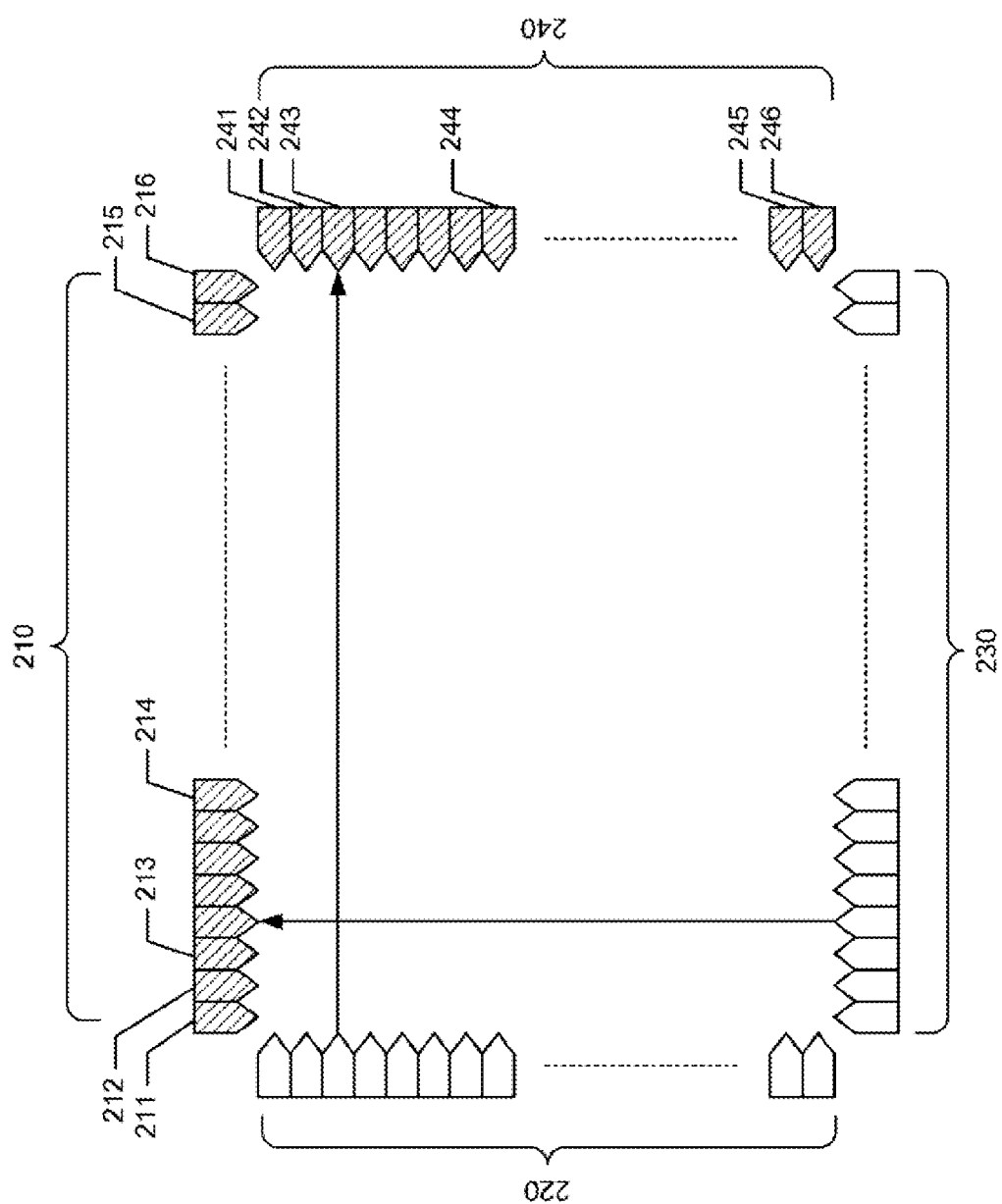
FIG. 3 is a view illustrating the operation of the multi-touch screen device in accordance with the second embodiment of the present invention.

FIG. 3 is a view illustrating the operation of the multi-touch screen device in accordance with the second embodiment of the present invention.

The infrared receiving and transmitting modules include N transmitting elements 230 on the horizontal axis, M transmitting elements 220 on the vertical axis, N receiving elements 210 on the horizontal axis, and M receiving elements 240 on the vertical axis.

In more detail, the magnitude of infrared light received by the receiving element of the $N^{th}$ receiving module on the vertical axis (x-axis) is defined as X(N) 216. The magnitude of infrared light received by the receiving element of the $M^{th}$ receiving module on the horizontal axis (y-axis) is defined as Y(N) 226.

In order to recognize touch input in the multi-touch screen device, scan values X(k) confirming whether or not touch measurement signals transmitted from the transmitting elements are interfered by an object are sequentially measured from 0 to N and scan values Y(k) confirming whether or not touch measurement signals transmitted from the transmitting elements are interfered by the object are sequentially measured from 0 to M.

Thereby, the values X(k) and Y(k) may be acquired through one scan, and multi-coordinates of objects obstructing the path of infrared light and the diameters of the objects may be acquired. Primarily, measurement values are normalized through Equations 1 to 2.

$$N_x(k) = \frac{(X_{max}(k) - X(k))^n}{(X_{max}(k))^n} \times G \quad \text{[Equation 1]}$$

Here, n is a natural number, such as 1 or 2, and determines whether or not the response degree of a noise component of a signal is linear or nonlinear. Such a measurement method is advantageous to calculation of a signal having a low background noise component, if n=1, and to calculation of a signal having a high background noise component, if n>1.

Here, normalization is a process of converting non-normal data into normal data suitable for standards.

G is a scaling value and is generally set to 1 or 100 and a measurement value calculated by Equation 1 is a normalization value of a measurement value of the x-axis.

y-axis coordinates may be acquired in the same manner as the x-axis coordinates.

$$N_y(k) = \frac{(Y_{max}(k) - Y(k))^n}{(Y_{max}(k))^n} \times G \quad \text{[Equation 2]}$$

A measurement value calculated by Equation 2 is a normalization value of a measurement value of the y-axis.

Here, $X_{max}$ and $Y_{max}$ are defined as the largest values among touch signals measured from the x-axis and the y-axis Formulas of calculating coordinates of a touch area using the normalized measurement values are expressed as Equations 3 and 4 below.

$N^{th}$ X coordinates are calculated by Equation 3 below and $N^{th}$ Y coordinates are calculated by Equation 4 below.

$$x(n) = \frac{\sum_{i}^{i+w} W \times (i+1) \times N_x(i)}{\sum_{i}^{i+w} N_x(i)} \quad \text{[Equation 3]}$$

$$y(n) = \frac{\sum_{j}^{j+h} H \times (j+1) \times N_y(j)}{\sum_{j}^{j+h} N_y(j)} \quad \text{[Equation 4]}$$

Here, i is a natural number from 0 to N, j is a natural number from 0 to M, W is the number of x-axis touch area receiving elements, and H is the number of y-axis touch area receiving elements. In the above Equations, W=S/N, H=S/M, and S and H are the maximum resolution of the screen.

That is, the multi-touch screen device calculates coordinates [x(n), y(n)] of a touch area based on touch signal measurement values [($N_x(k)$, $N_y(k)$)] acquired by normalizing magnitudes [(X(k), Y(k))] of received touch signals.

Further, formulas of calculating the diameters of the touch area using the normalized measurement values are expressed as Equations 5 and 6 below.

That is, the diameters of $N^{th}$ X coordinates are calculated by Equation 5 below and the diameters of $N^{th}$ Y coordinates are calculated by Equation 6 below.

$$dx(n) = \sum_{i}^{i+w} W \times N_x(i) \quad \text{[Equation 5]}$$

$$dy(n) = \sum_{j}^{j+h} H \times N_y(j) \quad \text{[Equation 6]}$$

Here, i is a natural number from 0 to N, j is a natural number from 0 to M, W is the number of x-axis touch area receiving elements, and H is the number of y-axis touch area receiving elements.

The multi-touch input device in accordance with the present invention calculates values $N_x(k)$ and $N_y(k)$ acquired by normalizing measurement values measured by touch measurement signal receiving elements so as to recognize a touch area, measures the case in that these values are greater than a first reference value $T_{lower}$, and calculates coordinates and diameters from at least one value which is continuously acquired so as to satisfy the condition of $T_{higher} > N_x(k)$, $N_y(k)$ through Equations 3 to 6 above, among these values. The diameters are used to confirm whether or not an issued touch signal is valid data satisfying a condition.

In accordance with another embodiment, validity of touch coordinates may be determined by measuring probability density values of a touch area.

In more detail, probability density measurement values of the touch area are defined by Equations 7 and 8.

$$T_x(n) = \left(\sum_{i}^{i+w} N_x(i)\right) / W \quad \text{[Equation 7]}$$

$$T_y(n) = \left(\sum_{j}^{j+h} N_y(j)\right) / H \quad \text{[Equation 8]}$$

Values determined by a specific probability density function through Equations 7 and 8 above may be set as the first reference value $T_{lower}$ and the second reference value $T_{higher}$ used in Equations 3 to 6.

Figure 4:
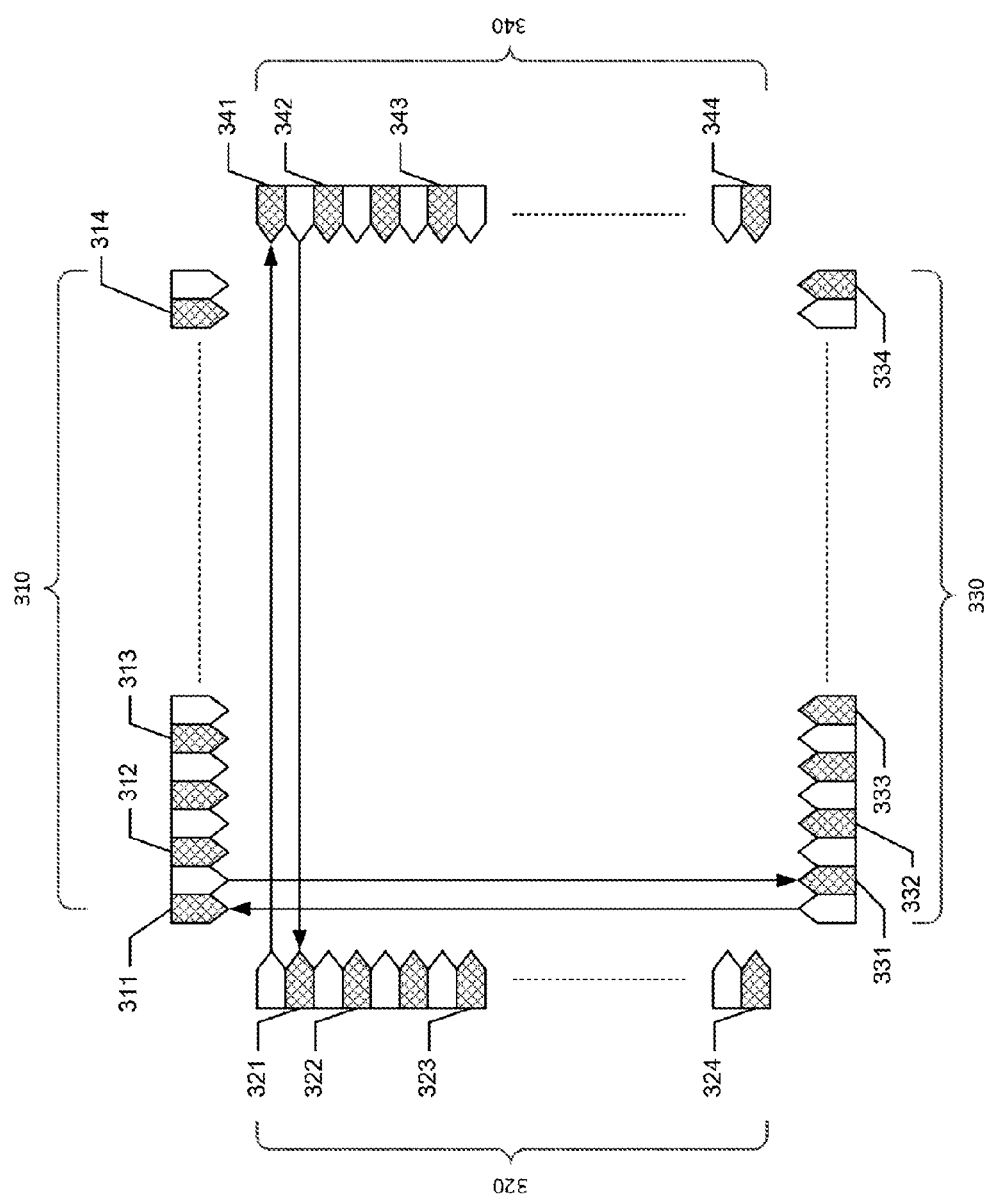
FIG. 4 is a view illustrating the operation of the multi-touch screen device in accordance with the second embodiment of the present invention in which receiving and transmitting elements are alternately arranged on one axis.

FIG. 4 is a view illustrating the operation of the multi-touch screen device in accordance with the second embodiment of the present invention.

FIG. 4 illustrates a modified embodiment of FIG. 3, and receiving and transmitting elements are alternately arranged at each side and perform scanning such that the receiving element on one side and the transmitting element on the other side are opposite to each other and thus form one pair. The opposite receiving and transmitting elements in one pair may simultaneously perform scanning.

In case of such an arrangement structure, disturbance in measurement when the opposite receiving and transmitting elements in one pair simultaneously perform scanning may be solved, a scan speed is increased to about twice the conventional scan speed, and, even if an infrared light element measurement range is exceeded due to natural light, such as sunlight, i.e., a sensor unit at one side is not operated, touch may be sensed only using a sensor unit at the other side.

FIG. 5 is a view illustrating the operation of the receiving and transmitting modules in the multi-touch screen device in accordance with the second embodiment of the present invention.

FIG. 6 is a view illustrating the operation of receiving and transmitting modules in a multi-touch screen device in accordance with a modified embodiment of FIG. 5.

First, reference numerals 410 and 510 denote transmitting element drivers driving the transmitting elements 430 and 530 transmitting touch measurement signals, and reference numerals 420 and 520 denote transmission driving switches turning the transmitting elements 430 and 530 on/off.

A touch measurement signal transmitted from the transmitting element of FIG. 5 is a signal 401 of a square wave type, and a touch measurement signal transmitted from the transmitting element of FIG. 6 is a signal 501 of a pulse type.

Reference numerals 440 and 540 denote receiving elements receiving touch measurement signals, reference numerals 450 and 550 denote reception driving switches turning the receiving elements 440 and 550 on/off, and reference numerals 460 and 560 denote reception amplifiers amplifying the signals received by the receiving elements. A signal having received by the reception amplifier 460 includes a noise signal, reference numeral 402 denotes a square wave-type touch measurement signal including a noise signal, and reference numeral 502 denotes a pulse-type touch measurement signal including a noise signal.

Reference numeral 470 denotes a narrow band filter to extract only a signal of a frequency band transmitted from the transmitting element from the signal received by the reception amplifier and to filter out an external noise signal.

Reference numeral 480 denotes a DC signal converter converting a high-frequency signal having passed through the narrow band filter 470 into a DC signal, and reference numerals 490 and 570 denote analog/digital (A/D) converters converting analog signals into digital signals.

Figure 7:
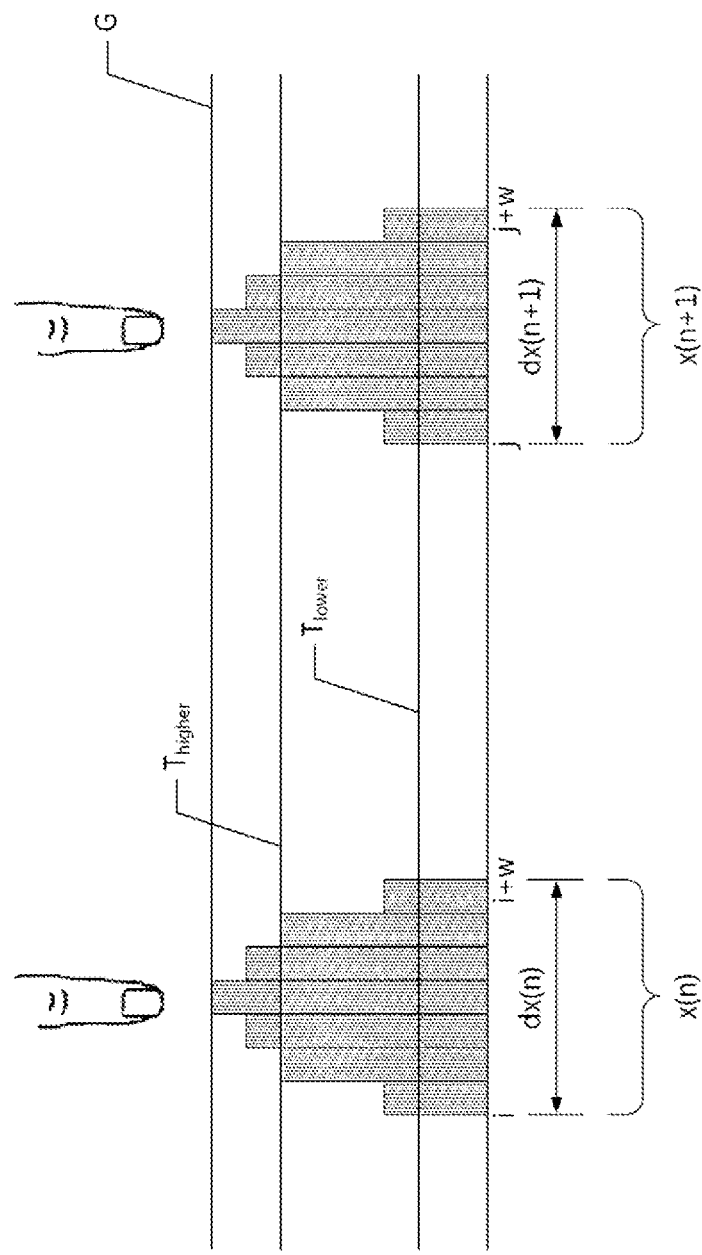
FIG. 7 is a view illustrating a principle of recognizing a touch point in the multi-touch screen device in accordance with the second embodiment of the present invention.

FIG. 7 is a view illustrating a principle of recognizing a touch point in the multi-touch screen device in accordance with the second embodiment of the present invention.

Figure 8:
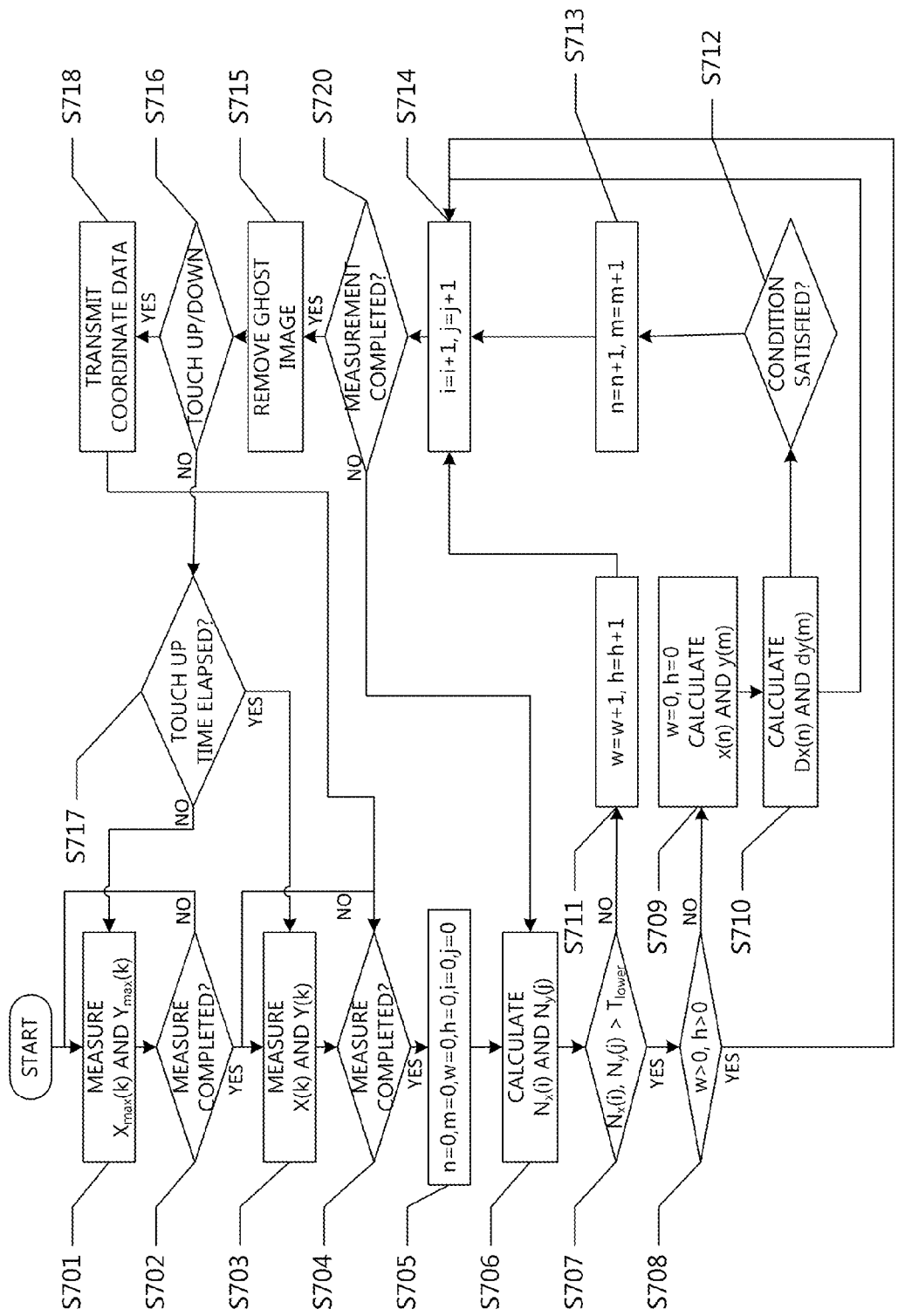
FIG. 8 is a flowchart illustrating a process of discriminating between an actual touch point and a touch point of a ghost image in the multi-touch screen device in accordance with the second embodiment of the present invention.

FIG. 8 is a flowchart illustrating a process of discriminating between an actual touch point and a touch point of a ghost image in the multi-touch screen device in accordance with the second embodiment of the present invention.

Hereinafter, a process of recognizing multiple areas in the multi-touch screen device in accordance with the present invention will be described.

First, the receiving elements shown in FIG. 5 or 6 measure the maximum values, i.e., values corresponding to $X_{max}(k)$ and $Y_{max}(k)$, out of touch measurement signals transmitted from the transmitting elements (Operation S701).

Whether or not measurement of $X_{max}(k)$ and $Y_{max}(k)$ has been completed is judged (Operation S702) and, upon judging that measurement of $X_{max}(k)$ and $Y_{max}(k)$ has been completed, Operation S703 is performed. In Operation S702, the measurement values regard an object disturbing infrared light as not being present on a touch surface.

In Operation S703, whether or not the touch measurement signals are received by the receiving elements is judged. That is, X(k) and Y(k) received by the respective receiving elements are measured.

In Operation S704, whether or not measurement has been completed is judged. Upon judging that measurement has been completed, Operation S705 is performed.

In Operation S705, variables used to measure values of touch areas, i.e., coordinates and diameters, are initialized. That is, respective variables are set, for example, n=0, m=0, w=0, h=0, i=0, and j=0.

Here, n is the number of coordinates and diameters of touch points acquired from the x-axis, m is the number of coordinates and diameters of touch points acquired from the y-axis, i is the index of the values of the sensor units of the x-axis and is a natural number selected from 0 to N, j is the index of the values of the sensor units of the y-axis and is a natural number selected from 0 to M, W=S/N, H=S/M, and S is the maximum resolution of the screen.

In Operation S706, the above Equations 1 and 2 are calculated.

In Operation S707, normalized $N_x(k)$ and $N_y(k)$ are calculated and, if acquired values are greater than the first reference value $T_{lower}$, Operation S711 is performed. If the acquired values are not greater than the first reference value $T_{lower}$, Operation S708 is performed.

In Operation S708, whether or not the values of W and H are zero is judged and, upon judging that the values of W and H are not zero, it is judged that pressing of the touch panel by touch is present and Operation S709 for calculation of final coordinates is performed. Upon judging that the values of W and H are zero, Operation S714 is performed.

In Operation S709, the values of W and H are initialized and x(n) and y(n) are calculated using the above Equations 3 and 4.

In Operation S710, the values of W and H are initialized and dx(n) and dy(n) are calculated using the above Equations 5 and 6.

In Operation S711, if the measured values of $N_x(k)$ and $N_y(k)$ in Operation S707 are greater than the first reference value $T_{lower}$, it is judged that there is an obstruction to touch measurement signals and thus, the values of W and H increase by 1. This means that determination of coordinates [x(n), y(n)] of touch areas is continuously progressed.

In Operation S712, a condition in which the calculated coordinates and diameters are restricted, for example, in which a specific diameter is not recognized as touch due to one or more restrictions, is judged and, as a result of judgment, if the condition is satisfied, Operation S713 is performed, and, if the condition is not satisfied, coordinate information is deleted and Operation S714 is performed. Here, the condition may be a judgment condition stated in the above Equations 7 and 8.

In Operation S713, the index values of n and m increase by 1, and, in Operation S714, the index values of i and j increase by 1.

In Operation S715, measurement of touch measurement signals at the coordinates of n×m is completed and ghost images in which presence and absence of an object cannot be measured are removed from these coordinates so that coordinates of actual touch points are acquired.

In Operation S716, if n=0 and m=0, i.e., in case of a touch-up state in which there is no touch of at least one point, Operation S717 is performed and, if n>0 and m>0, i.e., in case of a touch-down state, Operation S718 is performed.

In the touch-down state, the coordinates are transmitted to information equipment (Operation S718) and Operation S703 is performed so as to measure new coordinates.

In Operation S720, whether or not a condition of i=(N−1) and j=(M−1) is satisfied is judged and, upon judging that the condition is satisfied, it is judged that calculation of measurement values of all touch measurement signals has been completed and thus Operation S715 is performed, and upon judging that the condition is not satisfied, Operation S706 is performed and the next values of $N_x(k)$ and $N_y(k)$ are measured.

If the touch-up state is continued for a designated time, Operation S701 is performed and $X_{max}(k)$ and $Y_{max}(k)$ are re-measured and, if touch-up state is not continued for the designated time, Operation S703 is performed.

Figure 9:
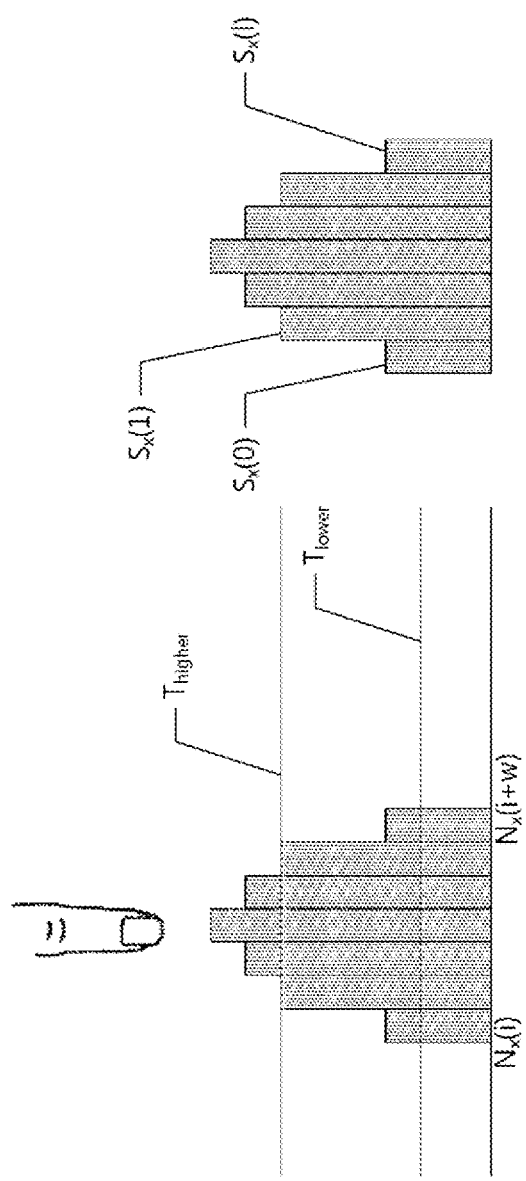
FIG. 9 is another view illustrating a principle of recognizing a touch point in the multi-touch screen device in accordance with the second embodiment of the present invention.

FIG. 9 is a view illustrating a principle of recognizing a touch point in the multi-touch screen device in accordance with the second embodiment of the present invention.

$N_x(k)$ and $N_y(k)$ in Operation S707 of FIG. 8 may be calculated with respect to only touch areas satisfying a condition of Equations 9 and 10 below.

$$P_x(k) = \sum_{i=0}^{l} N_x(k+i) \times S_x(i) \quad \text{[Equation 9]}$$

$$P_y(k) = \sum_{i=0}^{l} N_y(k+i) \times S_y(i) \quad \text{[Equation 10]}$$

Here, Sx(i) and Sy(i) are matching filters with a predefined matching touch pattern, and i is the number of samplings of the matching filters.

The reason why matching filters are applied in such a manner is that, among measured touch area values, only a specific touch pattern is recognized as touch and thus, improvement of a touch area recognition rate may be expected.

Although the above description states the multi-touch screen device in which the receiving elements or the transmitting elements are continuously arranged, the receiving elements or the transmitting elements are not continuously driven and adjacent transmitting elements and receiving element which are continuously arranged may alternately transmit and receive touch measurement signals by a designated time interval.

That is, at an arbitrary time t, even-numbered $$\left(X(0), X(2), X\left(\frac{k}{2}\right), \ldots, X(n)\right)$$

or odd-numbered $$\left(X(1), X(3), X\left(\frac{k}{2}+1\right), \ldots, X(n-1)\right)$$

transmitting elements transmit touch measurement signals and, at a time t+d after a designated time interval, the odd-numbered $$\left(X(1), X(3), X\left(\frac{k}{2}+1\right), \ldots, X(n-1)\right)$$

or even-numbered $$\left(X(0),\ X(2),\ X\!\left(\frac{k}{2}\right),\ \ldots,\ X(n)\right)$$

transmitting elements transmit touch measurement signals.

Further, in the same manner as the transmitting elements, at the arbitrary time t, even-numbered or odd-numbered receiving elements receive signals and, at the time t+d after the designated time interval, the odd-numbered or even-numbered receiving elements receive signals.

Figure 10:
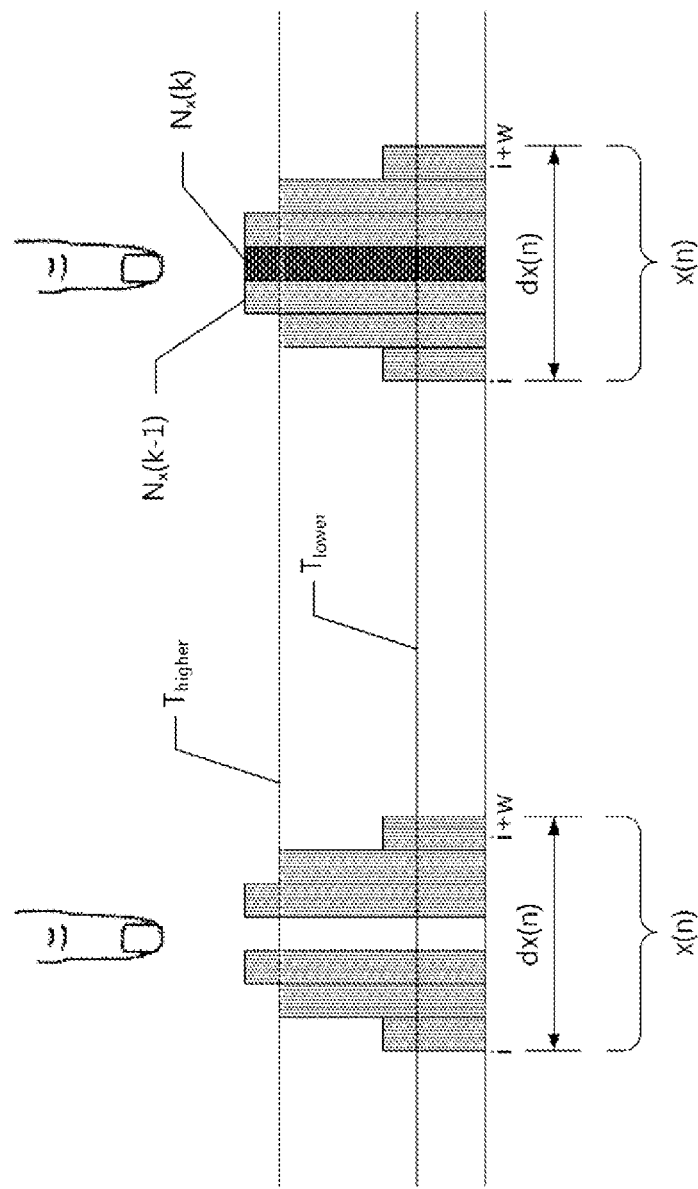
FIG. 10 is another view illustrating a principle of recognizing a touch point in the multi-touch screen device in accordance with the second embodiment of the present invention, if specific touch receiving and transmitting modules have failed.
Figure 11:
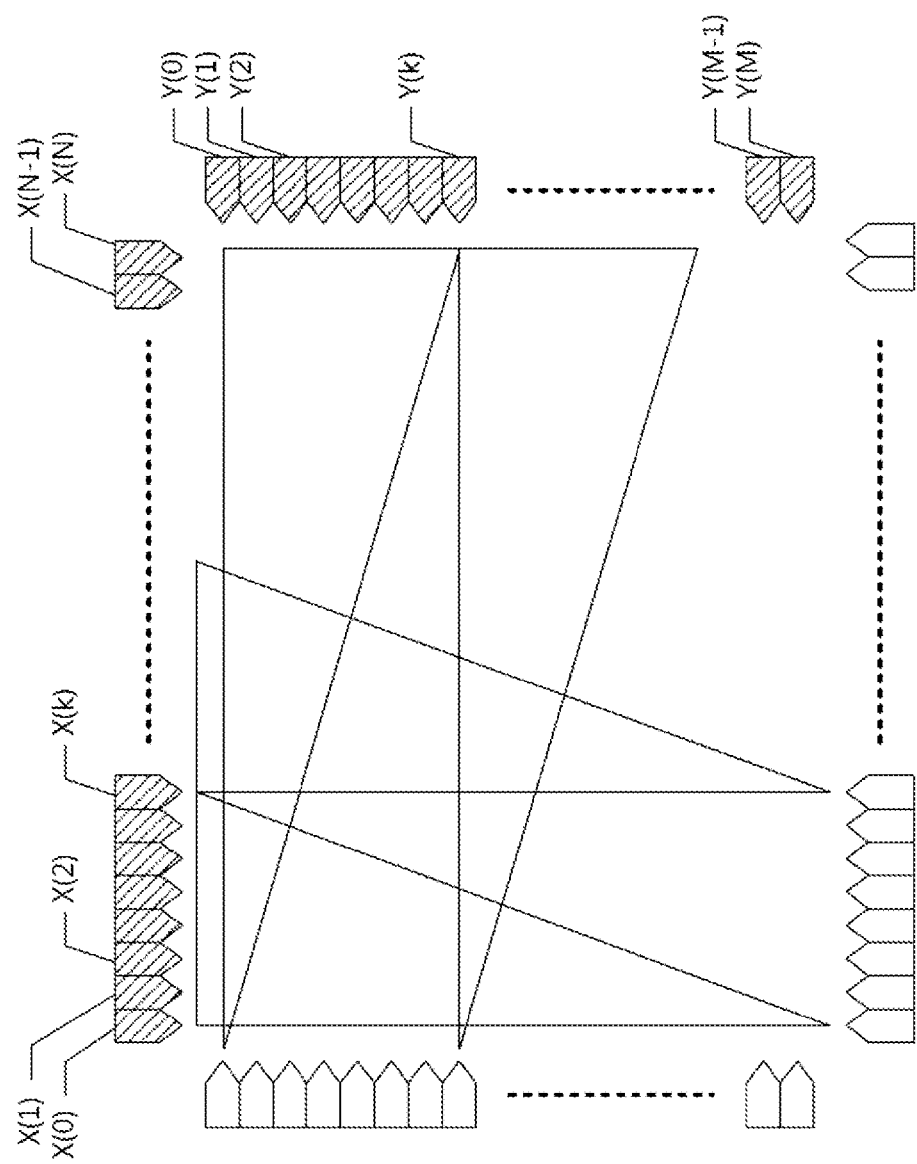
FIG. 11 is a view illustrating a principle of removing a ghost image by the transmission angle of transmitting elements in the multi-touch screen device in accordance with the second embodiment of the present invention.

FIG. 10 is another view illustrating a principle of recognizing a touch point in the multi-touch screen device in accordance with the second embodiment of the present invention, if specific touch receiving and transmitting modules have failed. In general, when infrared light receiving and transmitting elements fail, whether or not touch is present may not be judged. Therefore, in order to solve impossibility of signal measurement due to element failure, if $k^{th}$ receiving and transmitting elements fail, as exemplarily shown in FIG. 10, i.e., if $X_{max}(k)=0$ and $Y_{max}(k)=0$, as stated in Operation S706 of FIG. 8, malfunction of the touch screen may be prevented due to the failure by calculating coordinates by replacing $N_x(k)$ and $N_y(k)$ with $N_x(k-1)$ and $N_y(k-1)$.

Hereinafter, in order to remove ghost images of multiple coordinates in a touch screen in a matrix type, a method of removing a ghost image by judging whether or an object is present on the transmission angle path of a transmitting element and measuring third coordinates will be described. The ghost image removal method is carried out in Operation S715 of FIG. 8.

Figure 12:
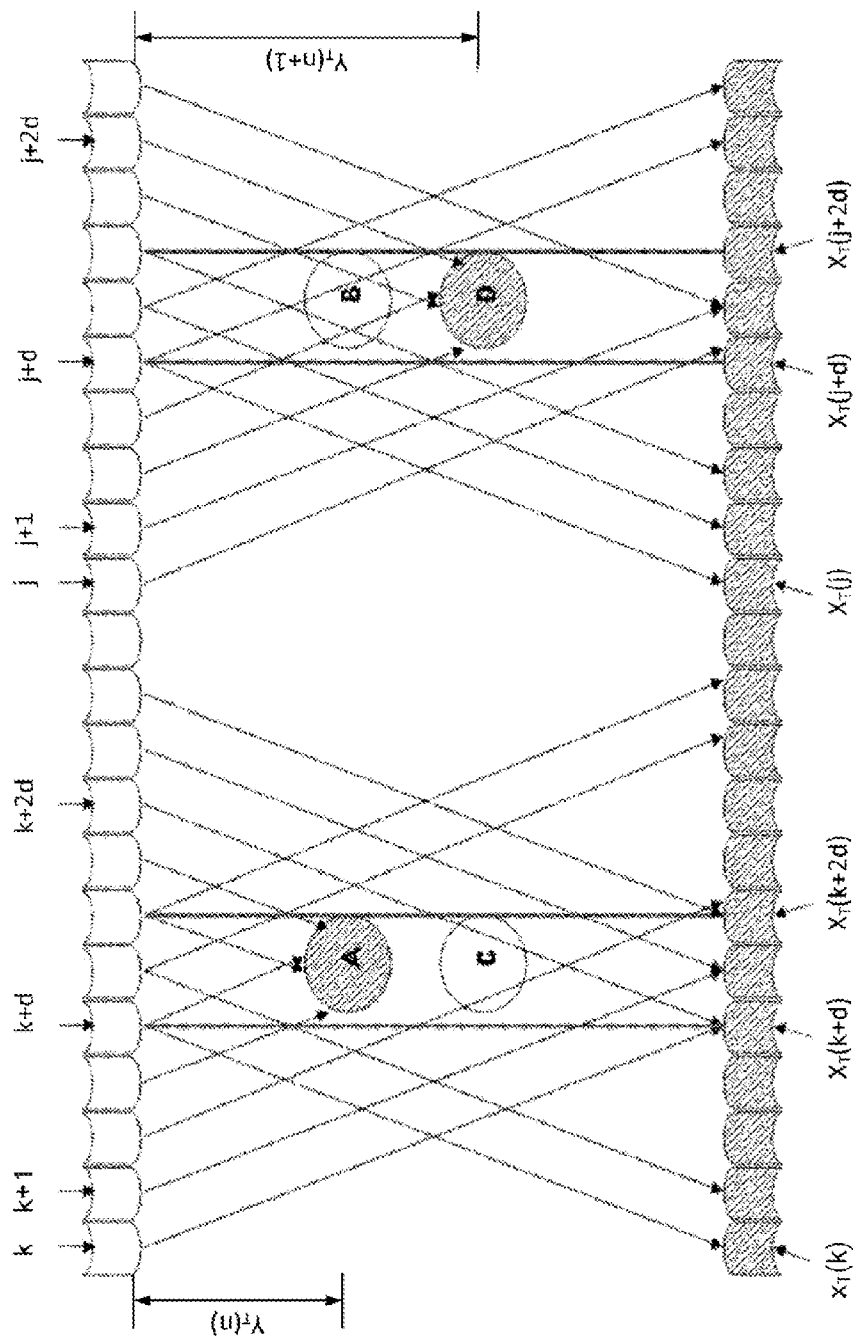
FIG. 12 is a view illustrating a process of removing a ghost image by the transmission angle of transmitting elements in the multi-touch screen device in accordance with the second embodiment of the present invention.

In FIG. 12, when a $(k+d)^{th}$ transmitting element transmits a touch measurement signal, scanning is performed at an oblique angle so that a $k^{th}$ receiving element receives the transmitted touch measurement signal and thus, $X(k)$ is measured.

In the same manner, when a $k^{th}$ transmitting element transmits a touch measurement signal, scanning is performed at an oblique angle so that a $(k+d)^{th}$ receiving element receives the transmitted touch measurement signal and thus, $X(k+d)$ is measured.

In this case, in FIG. 12, as an example of scanning at an gradient of an obtuse angle from the x-axis, on the assumption that the position values of objects on the y-axis through measurement of coordinates by scanning of $n^{th}$ and $(n+1)^{th}$ touch objects at a gradient are $y(n)$ and $y(n+1)$ (in FIG. 12, illustrated as $y_T(n)$ and $y_T(n+1)$), $y(n)$ and $y(n+1)$ are calculated by Equations 11 and 12 below.

$$y(n) = \frac{\sum_{i=0}^{d} W_T \times (i+1) \times N_x(k+i)}{\sum_{i=0}^{d} N_x(k+i)} \qquad \text{[Equation 11]}$$

Here, k means the index of a central sensor in an area in which an infrared light path is shielded by the position of the $n^{th}$ object of the x-axis.

$$y(n+1) = \frac{\sum_{i=0}^{d} W_T \times (i+1) \times N_x(j+i)}{\sum_{i=0}^{d} N_x(j+i)} \qquad \text{[Equation 12]}$$

Here, j means the index of a central sensor in an area in which an infrared light path is shielded by the position of the $(n+1)^{th}$ object of the x-axis. $W_T=S/d$, S means the resolution of the x-axis, and d means a distance determining an oblique angle when scanning at the oblique angle is performed.

In order to remove a ghost image, a procedure below is carried out.

The reason for generation of a ghost image is that whether or not a plurality of touch objects is present is respectively measured through a right angle scanning method. On the other hand, if a plurality of touch objects is measured through an oblique angle scanning method, no ghost image is generated and only actual touch objects are measured by receiving elements.

Therefore, in order to remove ghost images, ① receiving elements scan multiple touch objects at a right angle from transmitting elements. At this time, ② the receiving elements measure orthogonal coordinates of ghost images as well as actual touch objects. Thereafter, the receiving elements scan infrared light actually transmitted from the transmitting elements at an oblique angle (an acute or obtuse angle). At this time, the receiving elements do not measure coordinates of the ghost images and measures only coordinates of the actual touch objects. ③ The coordinates of the actual touch objects and coordinates of the ghost images measured through right angle scanning are converted into virtual oblique angle scanning coordinates in which scanning at an oblique angle is assumed. Such conversion serves to compare the virtual oblique angle scanning coordinates with coordinates actually measured through oblique angle scanning at the same level. Therefore, ④ the virtual oblique angle scanning coordinates are compared with the coordinates actually measured through oblique angle scanning and the virtual oblique angle scanning coordinates not coinciding with the coordinates actually measured through oblique angle scanning are judged as ghost images. As a result, ⑤ the controller removes the coordinates judged as ghost images.

FIG. 12 illustrates that the receiving elements scan touch objects at a right angle and then scan the touch objects at an acute or obtuse angle, sequentially. That is, the receiving elements sequentially scan the touch objects at right and acute angles or sequentially scan the touch objects at right and obtuse angles.

Figure 13:
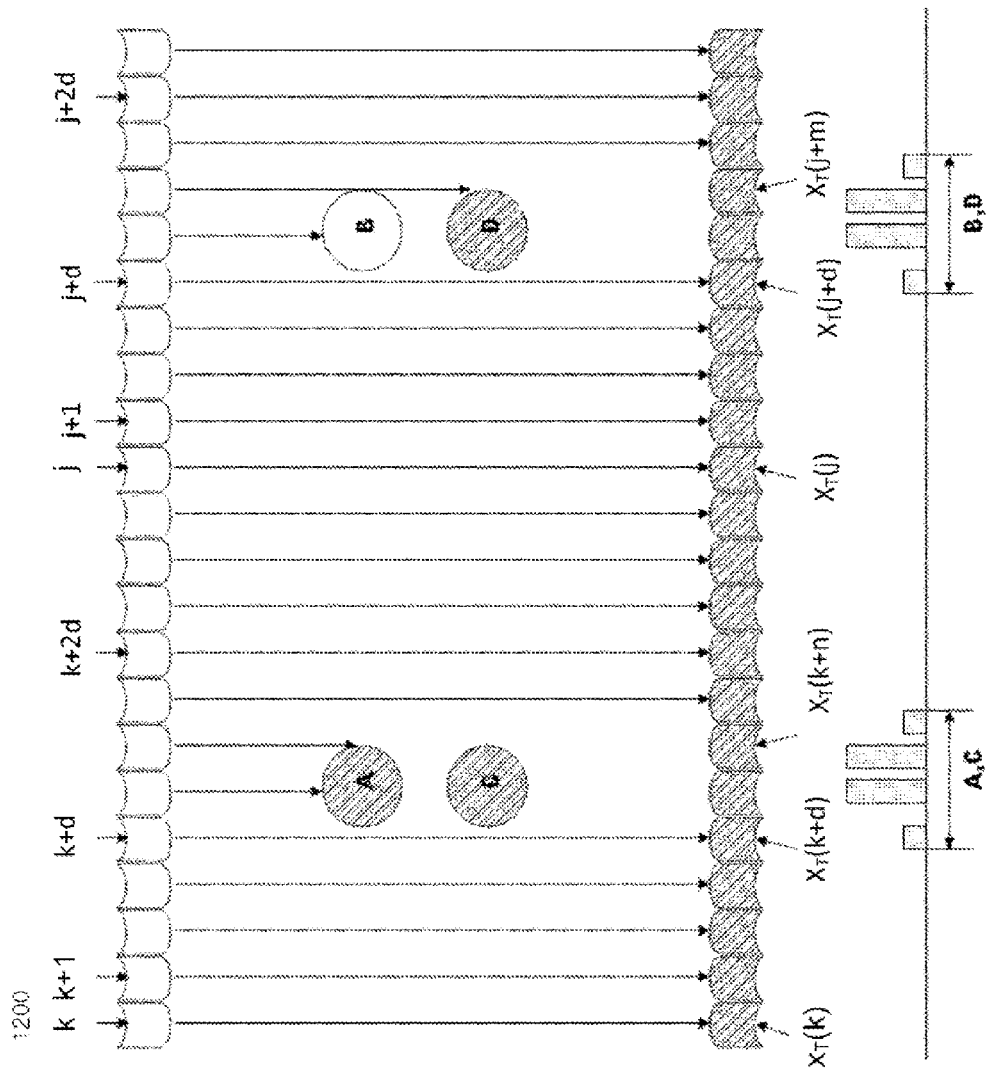
FIG. 13 is a view illustrating a process of removing a ghost image, if the transmitting elements transmit signals at a right angle, in the multi-touch screen device in accordance with the second embodiment of the present invention.

First, in the upper portion of FIG. 13, the receiving elements scan infrared signals, radially transmitted from the transmitting elements, at a right angle and thus measure X and Y coordinates of multiple point touch areas. If objects A, C, and D are placed on the touch surface, orthogonal coordinates of the objects A, C, and D and a ghost image B are measured under the condition that the ghost image B is not discriminated from the objects A, C and D. Infrared signals are radiated between x-axis and y-axis transmitting and receiving units so as to be orthogonal to each other and, if multiple touches in a diagonal direction occur, a ghost image is generated by interaction of a plurality of touch areas. That is, 2 touch signals on the x-axis and 2 touch signals on the y-axis are sensed and consequently, 4 touch signals including a ghost image are generated.

The receiving elements converts orthogonal coordinates [$x_0(n)$, $y_0(n)$] acquired by scanning at a right angle into virtual oblique coordinates [$X_{TC}$, $Y_{TC}$] using Equations 13 and 14 below. Since the orthogonal coordinates include the ghost image, the virtual oblique coordinates [$X_{TC}$, $Y_{TC}$] converted therefrom include the ghost image also. This is shown in the lower portion of FIG. 13.

Here, $X_{TC}$ and $Y_{TC}$ are virtual oblique coordinates converted from the orthogonal coordinates of the ghost image as well as the actual images measured by right angle scanning. That is, it will be understood that these values are not measurement values actually acquired by oblique angle scanning and are virtual coordinate values converted from right angle scanned values including the ghost image by the controller so as to be compared with measurement values actually acquired by oblique angle scanning excluding the ghost image at the same level. The orthogonal coordinates [$x_0(n)$, $y_0(n)$] acquired by right angle scanning are converted into coordinates located at positions separated from the orthogonal coordinates [$x_0(n)$, $y_0(n)$] in proportion to the gradient of virtual oblique angle scanning. That is, such conversion is performed using linear relations between $X_{TC}$ and $y_0(m)$ and between $Y_{TC}$ and $x_0(n)$, $$x_{TC}(n+m) = x_0(n) - y_0(m)\left(\frac{d}{Y_C}\right) \quad \text{[Equation 13]}$$

$$y_{TC}(n+m) = y_0(m) - x_0(n)\left(\frac{d}{X_C}\right) \quad \text{[Equation 14]}$$

Here, $x_0(n)$ and $y_0(m)$ are orthogonal coordinates including ghost images, measured by right angle scanning. $X_C$ and $Y_C$ mean the numbers of receiving elements used to measure touch, and d is a constant, i.e., a gradient factor determined by a line connecting a receiving element and a transmitting element during oblique angle scanning. n is the number of touch objects on the x-axis, and m is the number of touch objects on the y-axis.

Hereinafter, a method of judging a ghost image will be described in detail.

A ghost image is removed using a principle of judging that a ghost image is present on orthogonal coordinates if there is a distance difference between virtual oblique angle conversion coordinates [$X_{TC}$, $Y_{TC}$], corresponding to an area converted from a coordinate area [$x_0(n)$, $y_0(n)$] measured when receiving elements actually scan touch objects at a right angle and expected that touch objects are present, and coordinates [$X_T$, $Y_T$] measured by oblique angle scanning or if such a distance difference is greater than a specific critical value.

As described above, in FIG. 13, in case of right angle scanning, even if three touch objects A, C and D are present, 4 orthogonal coordinates of the touch objects A, C and D and a ghost image B are measured. Thus, 4 virtual oblique angle scanning conversion coordinates [$X_{TC}$, $Y_{TC}$] of the touch objects A, C and D and the ghost image B are acquired also. However, in case of oblique (acute) angle scanning, coordinates [$X_T$, $Y_T$] of only the three touch objects A, C and D are measured. Therefore, the virtual oblique angle scanning conversion coordinates (4 coordinates) converted from the orthogonal coordinates measured by right angle scanning are compared with the actual coordinates (3 coordinates) measured by acute angle scanning and thus, 1 ghost image having a distance difference may be selected. Numerical formulas to deduce the ghost image are calculated by Equations 15 and 16 below.

$$D_{xr} = |x_T(n) - x_{TC}(m)| \quad \text{[Equation 15]}$$

$$D_{yr} = |y_T(n) - y_{TC}(m)| \quad \text{[Equation 16]}$$

If $D_{xr}(n)$ and $D_{yr}(n)$ are greater than a specific critical value, it is judged that corresponding coordinates correspond to a ghost image. The specific critical value is predetermined according to the density of used infrared receiving element sensors. n is the number of coordinates of actual touch objects measured by acute angle scanning and m is the number of coordinates including the ghost image converted from coordinates measured by right angle scanning through Equations 13 and 14.

Figure 15:
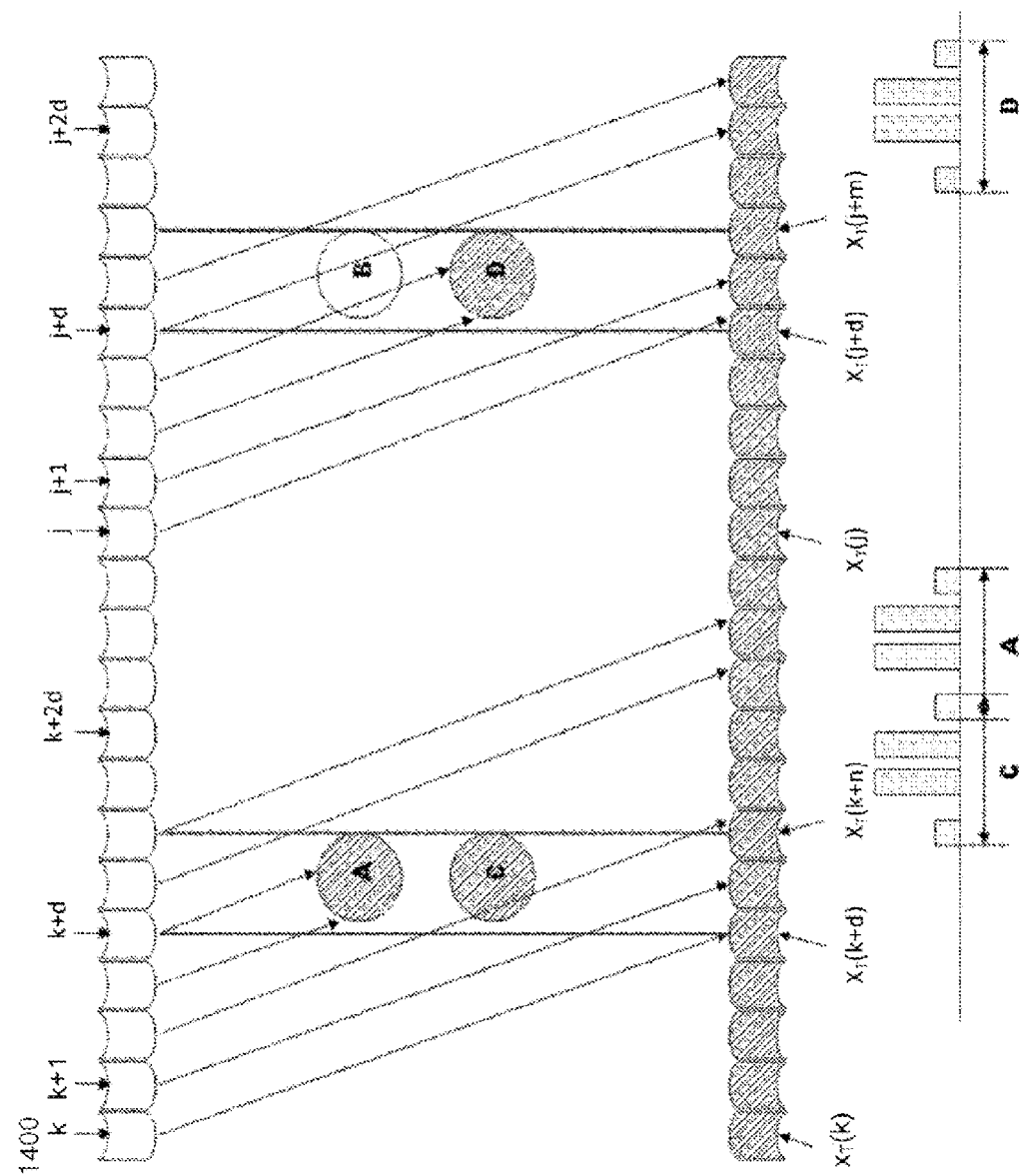
FIG. 15 is a view illustrating a process of removing a ghost image, if the transmitting elements transmit signals at the right angle and at a designated angle in the rightward direction, in the multi-touch screen device in accordance with the second embodiment of the present invention.

Further, as exemplarily shown in FIG. 15, coordinates of touch areas may be measured by performing scanning at an oblique angle in the rightward direction, i.e., by performing scanning such that touch measurement signals have an obtuse angle from the lower surfaces of the receiving elements. Here, coordinates measured by right angle scanning are converted into virtual oblique (obtuse) angle scanning conversion coordinates [$X_{TC}$, $Y_{TC}$] through Equations 17 and 18, and a ghost image is judged through Equations 19 and 20. Such a process is the same as the above-described process using Equations 13 to 16 in that this process obtuse angle scanning while the above-described process uses acute angle scanning.

$$x_{TC}(n) = x_0(n) + y_0(n)\left(\frac{d}{Y_C}\right) \quad \text{[Equation 17]}$$

$$y_{TC}(n) = y_0(n) + x_0(n)\left(\frac{d}{X_C}\right) \quad \text{[Equation 18]}$$

$$D_{xr}(n) = |x_T(n) - x_{TC}(n)| \quad \text{[Equation 19]}$$

$$D_{yr}(n) = |y_T(n) - y_{TC}(n)| \quad \text{[Equation 20]}$$

Figure 14:
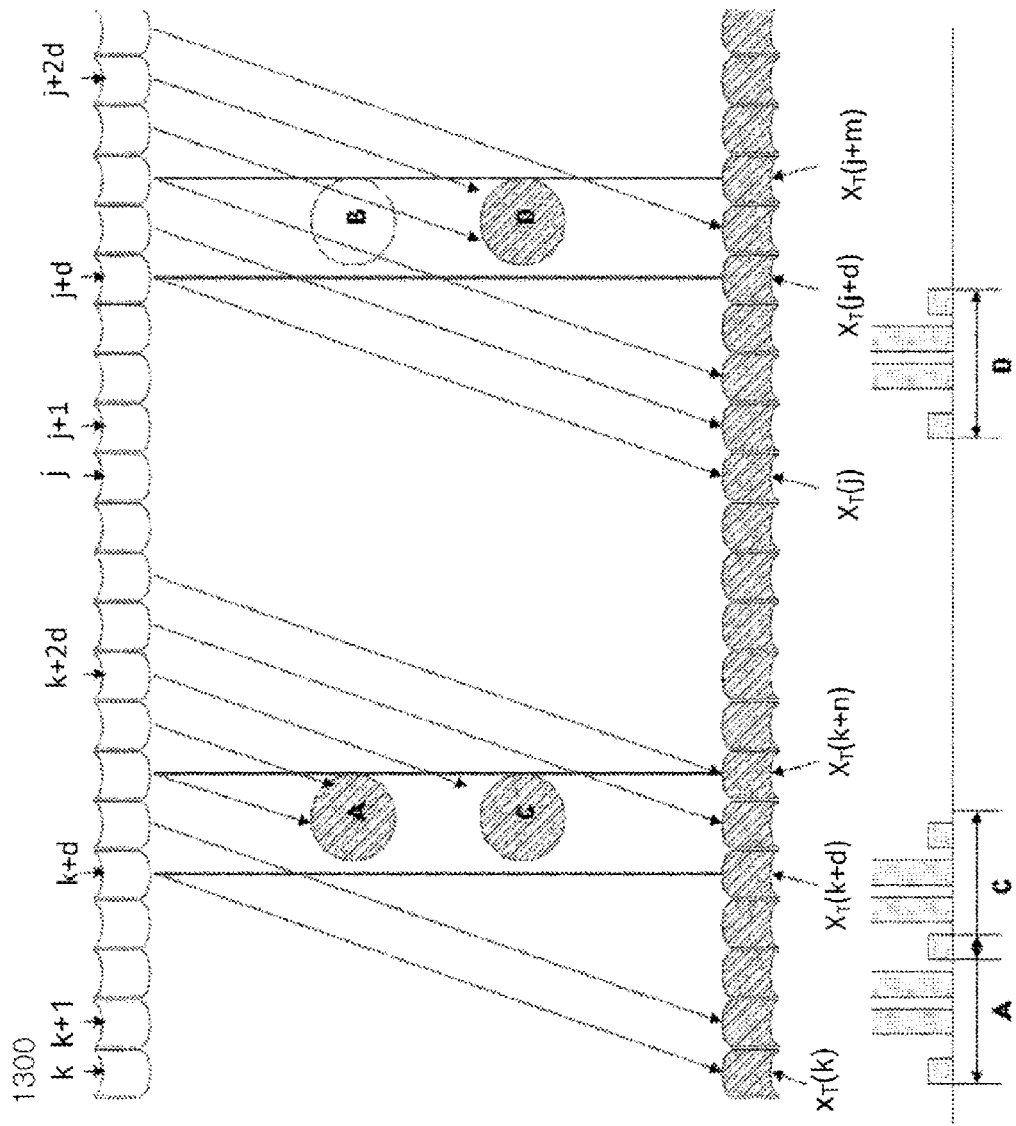
FIG. 14 is a view illustrating a process of removing a ghost image, if the transmitting elements transmit signals at the right angle and at a designated angle in the leftward direction, in the multi-touch screen device in accordance with the second embodiment of the present invention.

It is understood that, if scanning at an oblique angle is performed, as exemplarily shown in FIGS. 14 and 15, the receiving elements continuously scan touch measurement signals radially transmitted from the transmitting elements at right and oblique (obtuse or acute) angles sequentially. Ghost images generated due to right angle scanning may be removed using oblique angle scanning.

Hereinafter, another embodiment will be described.

In general, in a conventional large infrared touch screen, several persons simultaneously and rapidly touch the touch screen in various directions and there is a difficulty in accurately sensing touch objects and removing ghost images in momentary and composite operation.

Therefore, a sequential scanning method of receiving modules in which receiving modules sequentially scan a measurement signal radially transmitted from one transmitting module at right, acute, and obtuse angles is proposed, as exemplarily shown in FIG. 12. On the other hand, although the receiving module sequentially scan the measurement signal at right, obtuse, and acute angles, the multi-touch screen device may correspond to multi-touch of a composite operation type. That is, the multi-touch screen device is characterized in that a plurality of receiving elements arranged at positions at right and obtuse angles from one transmitting element sequentially scans touch objects in order of right, acute, and obtuse angles or in order of right, obtuse, and acute angles.

Figure 16:
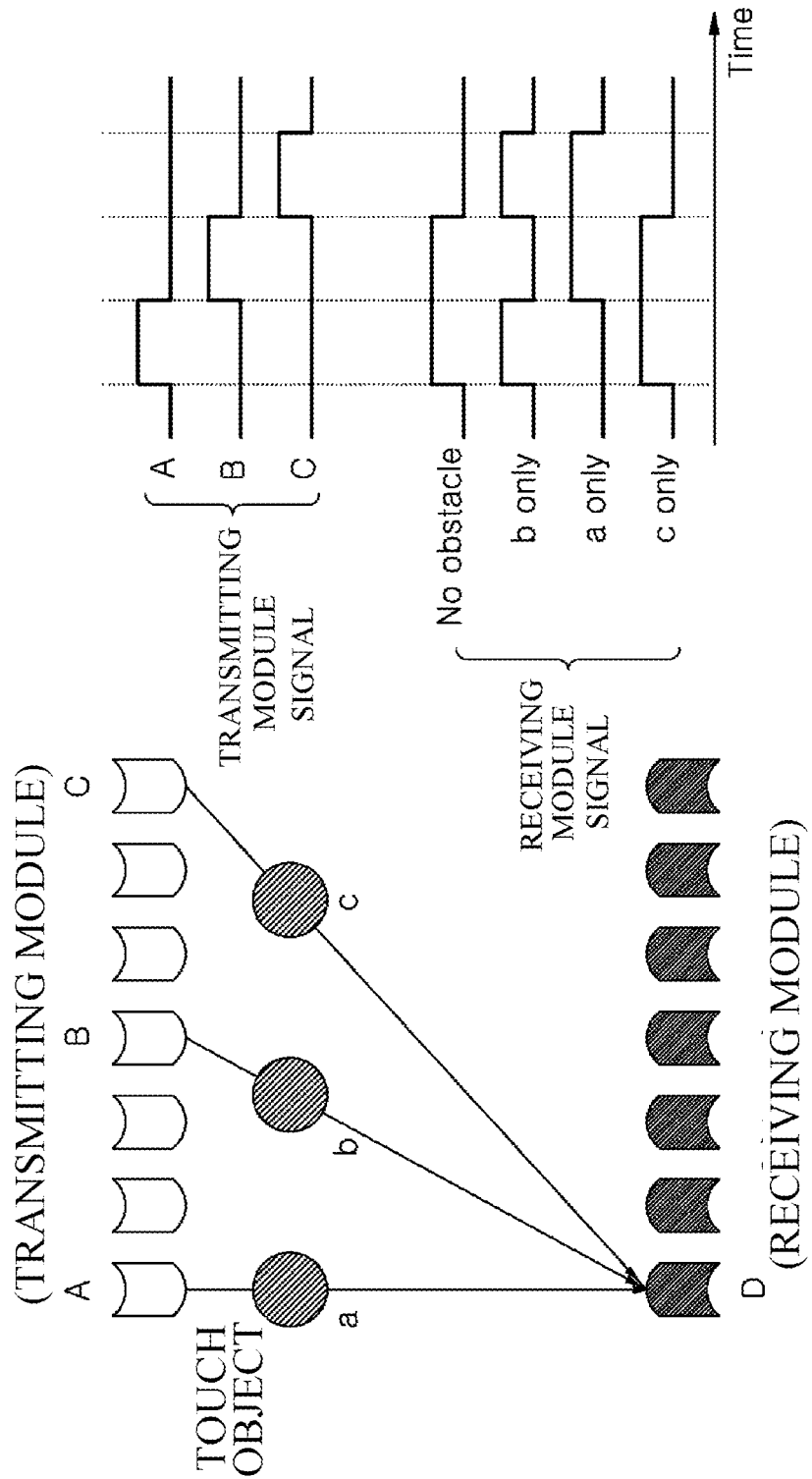
FIG. 16 is a view illustrating a scanning principle of transmitting modules in the multi-touch screen device in accordance with the second embodiment of the present invention.

Further, a sequential scanning method of transmitting modules in which a plurality of transmitting modules sequentially transmit measurement signals to one receiving module, as exemplarily shown in FIG. 16. Here, a plurality of transmitting modules may sequentially transmit measurement signals to one receiving module at right, acute, and obtuse angles or at right, obtuse, and acute angles. That is, the multi-touch screen device is characterized in that a plurality of transmitting elements located at positions at right and obtuse angles from one receiving element sequentially transmits measurement signals to the receiving element in order of right, acute, and obtuse angles or in order of right, obtuse, and acute angles.

Although the above description states sequential transmission of measurement signals in order of right, acute, and obtuse angles, the transmitting modules may sequentially transmit measurement signals to the receiving element in order of gradual decrease or increase in the angle from the lower surface of the receiving element, as exemplarily shown in FIG. 16.

In FIG. 16, transmitting modules A, B, and C including transmitting elements sequentially transmit touch measurement signals. Therefore, if there is no touch object, a receiving module D receives all the measurement signals from the transmitting modules A, B, and C. If there is only a touch object b, the receiving module D does not receive the measurement signal from the transmitting module B among the measurement signals from the transmitting modules A, B, and C. If there is only a touch object a, the receiving module D does not receive the measurement signal from the transmitting module A among the measurement signals from the transmitting modules A, B, and C. Further, if there is only a touch object c, the receiving module D does not receive the measurement signal from the transmitting module C among the measurement signals from the transmitting modules A, B, and C. In such a manner, not only the receiving module scans touch objects but also the transmitting modules scan touch objects in various directions. Thus, objects simultaneously performing multi-touch on the screen device in several directions may be easily sensed.

As stated above, a method in which receiving modules located at various angles sequentially scan infrared light transmitted from a transmitting module including one transmitting element and a method in which transmitting modules located at various angles sequentially transmit infrared light to one receiving module has been described.

Although the above description discriminates between the sequential scanning method of a plurality of receiving modules and the sequential scanning method of a plurality of transmitting modules, the sequential scanning method of receiving modules and the sequential scanning method of transmitting modules may be used together. For this purpose, when a plurality of receiving module sequentially scans one transmitted signal at oblique angles, i.e., acute and obtuse angles, the touch measurement signal from the $k^{th}$ transmitting module is scanned by $(k+d)^{th}$ receiving module at an oblique angle and, on the other hand, when the transmitting modules perform sequential scanning at obtuse and acute angles, the touch measurement signal from the $(k+d1)^{th}$ transmitting module is scanned by $k^{th}$ receiving module at an oblique angle, and thus, signal interference may be prevented. Here, d is a factor determining the magnitude of a scanning oblique angle during oblique angle scanning and representing the degree of a scanning gradient. Consequently, if the sequential scanning method of receiving modules and the sequential scanning method of transmitting modules are used together, oblique angles, i.e., scan angles, of the two methods need to vary.

This embodiment of the present invention provides a multi-touch screen device in which a plurality of receiving elements located at right and oblique angles from one transmitting element sequentially scans touch objects toward the transmitting element at right, acute, and obtuse angles or at right, obtuse, and acute angles and a plurality of transmitting elements located at right and oblique angles from one receiving element performs sequential scanning toward the receiving element at right, acute, and obtuse angles or at right, obtuse, and acute angles.

If the sequential scanning method of receiving modules and the sequential scanning method of transmitting modules are used together in such a manner, a scan density of a matrix arrangement formed by infrared measurement signals of the x-axis and y-axis may be increased and thus, a scan speed may be improved and composite operation of touch objects may be rapidly sensed. Further, scanning at various directions may be performed and thus, generation of ghost images may be prevented and minute touch may be sensed.

Hereinafter, a third embodiment of the present invention will be described.

Figure 17:
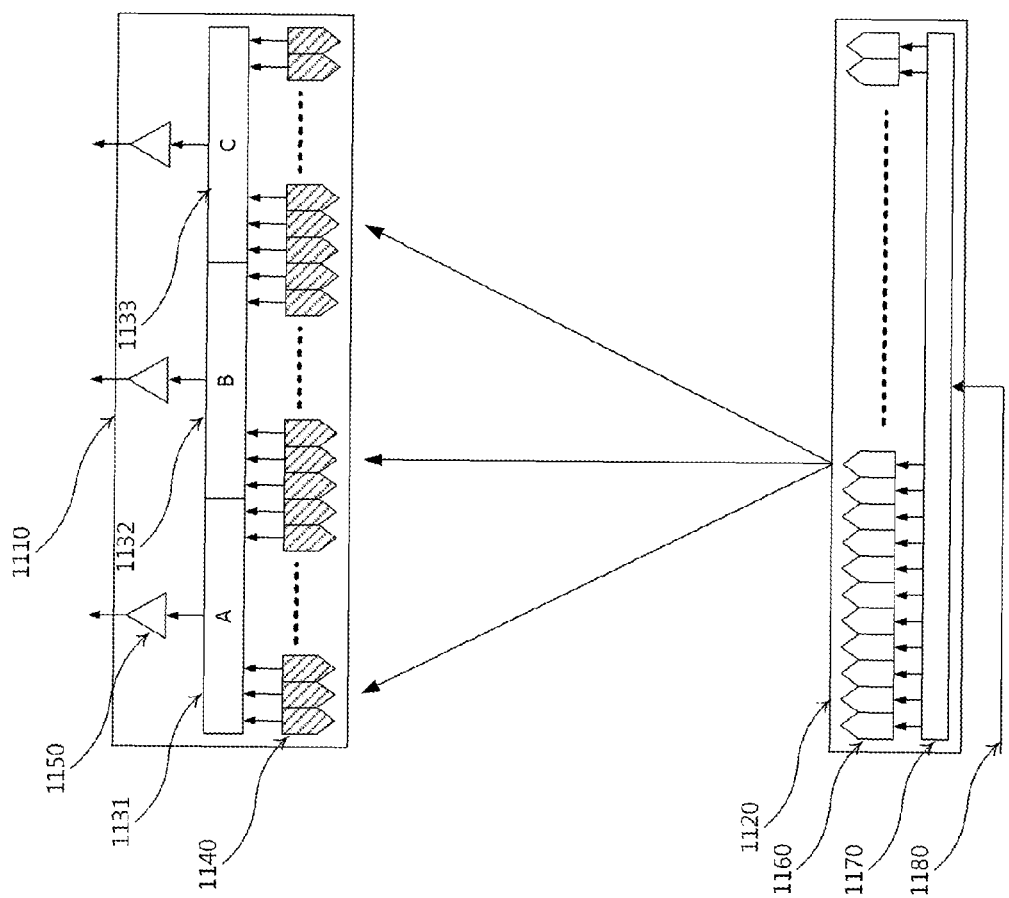
FIG. 17 is a view illustrating the configuration of a multi-touch screen device having a module type touch measurement signal receiving unit in accordance with a third embodiment of the present invention.

In a multi-touch screen device shown in FIG. 17, a touch measurement signal is radially transmitted from a touch measurement signal transmitting unit 1160 at a designated angle and is simultaneously measured by 3 touch measurement signal receiving units 1140 located at predetermined acute, right, and obtuse angles. Here, a designated number of the touch measurement signal receiving units 1140 is modularized into receiving unit modules A, B, and C, and a designated number of the receiving unit modules A, B, and C is unified into a receiving unit module group 1110.

A designated number of touch measurement signal transmitting units 1160 is unified into a transmitting unit group 1120.

The receiving unit modules A, B, and C respectively convert touch measurement signals, received by the touch measurement signal receiving units 1140 of the respective receiving unit modules A, B, and C, into voltage signals through receiving unit module signal converters 1131, 1132 and 1133.

An A/D converter 1150 converting an analog signal, i.e., the voltage signal, into a digital signal is connected to each of the receiving unit modules A, B, and C and outputs the digital value, converted from the received value of the touch position measurement signal, to a controller.

Although not shown in the drawings, a transmission driving clock unit outputs a transmission unit driving clock 1180 so as to simultaneously drive the touch measurement signal transmitting units 1160 having the same index of the transmitting unit group 1120.

The driving clock 1180 output by the transmission driving clock unit is supplied to a transmitting unit driver 1170 and drives the touch measurement signal transmitting units 1160 so as to radially transmit touch measurement signals at a designated angle.

Figure 18:
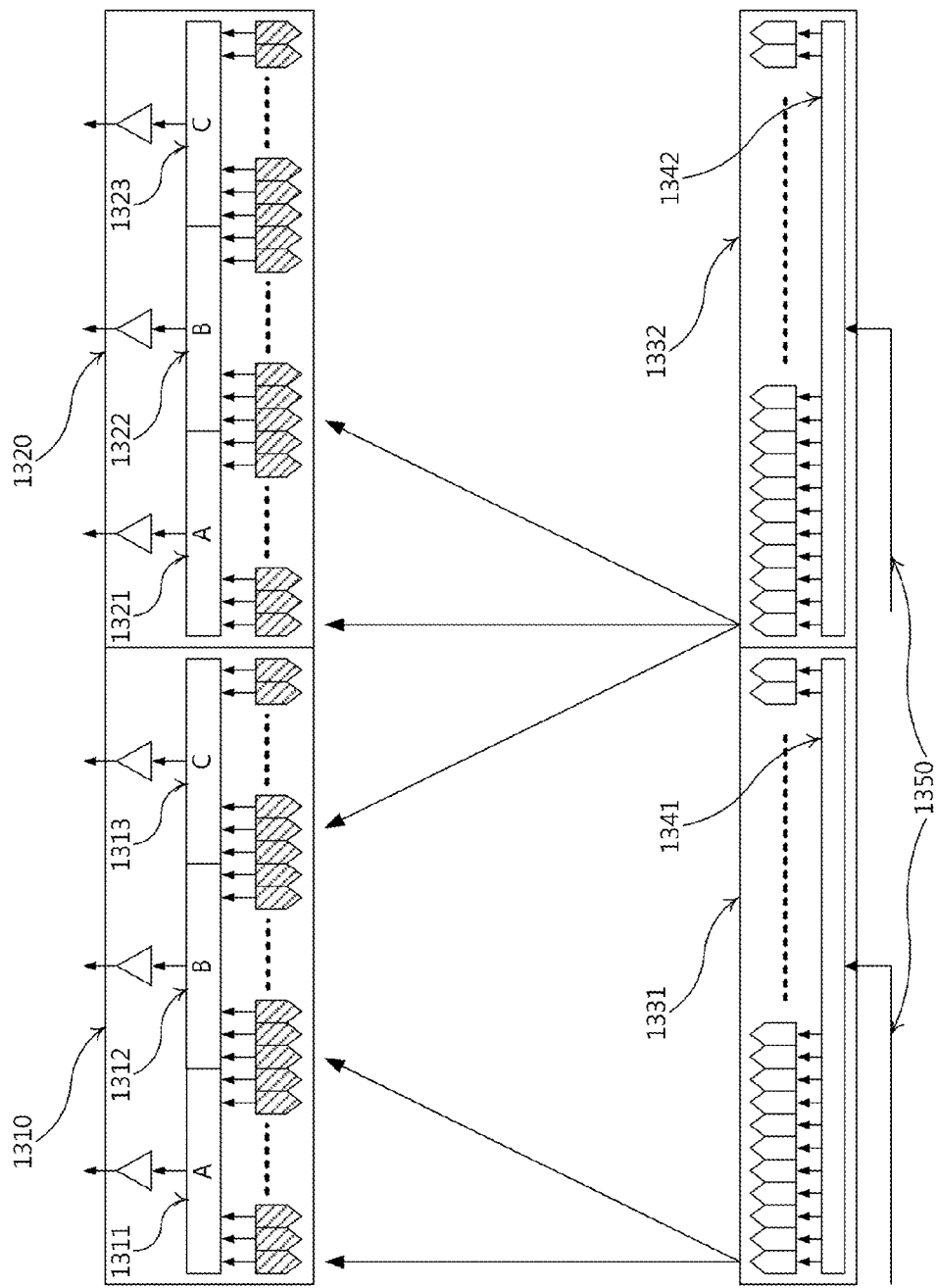
FIG. 18 is a view illustrating the operation of the multi-touch screen device in accordance with the third embodiment of the present invention.

Hereinafter, operation of the multi-touch screen device having the above-described configuration in accordance with the third embodiment of the present invention will be described with reference to FIG. 18.

A designated number of the touch measurement signal receiving units is modularized into receiving unit modules A, B, and C, and the receiving unit modules A, B, and C is unified into receiving unit module groups N and N+1. Further, a designated number of touch measurement signal transmitting units is unified into transmitting unit groups $R_N$ and $R_{N+1}$, as described above.

When a driving clock CLK of a transmission driving clock unit is supplied to transmitting unit drivers, the transmitting unit drivers drive the transmitting units having the same index of the respective transmitting unit groups $R_N$ and $R_{N+1}$, i.e., the transmitting units $R_N(n)$ and $R_{N+1}(n)$, through the driving clock so as to simultaneously radially transmit touch measurement signals, each of which includes an acute angle touch measurement signal R2, a right angle touch measurement signal R1, and an obtuse angle touch measurement signal R3.

Here, the touch measurement signals radially transmitted from the touch measurement signal transmitting unit of one transmitting unit group are received by the touch measurement signal receiving units forming the receiving unit modules A, B, and C, and the controller calculates coordinates or diameters of touches using the touch measurement signals received by the receiving units located at predetermined angles, i.e., obtuse, right, and acute angles, among the touch measurement signals radially transmitted from one transmitting unit.

That is, the controller calculates coordinates or diameters of touches using only the touch measurement signal received by the touch measurement signal receiving unit of the module A located at the position of an acute angle from the transmitting unit $R_N(n)$, the touch measurement signal received by the touch measurement signal receiving unit of the module B located at the position of an right angle from the transmitting unit $R_N(n)$, and the touch measurement signal received by the touch measurement signal receiving unit of the module C located at the position of an obtuse angle from the transmitting unit $R_N(n)$, among the touch measurement signal transmitted from the transmitting unit $R_N(n)$.

Touch positions are measured by applying the touch measurement signals received by the respective receiving units in the above-described method to Equations 1 to 20 and Equations A and B, as described in the first and second embodiments.

According to the above-described method, in the third embodiment of the present invention, since the touch measurement signal transmitting units having the same index of the respective transmitting unit groups $R_N$ and $R_{N+1}$ simultaneously transmit touch measurement signals and the touch measurement signal receiving units of the respective receiving unit modules A, B, and C receive at least one touch measurement signal, touch positions may be not only more rapidly measured but also more accurately measured. Therefore, even if the touch positions are rapidly changed, the touch positions may be rapidly and accurately measured.

Figure 19:
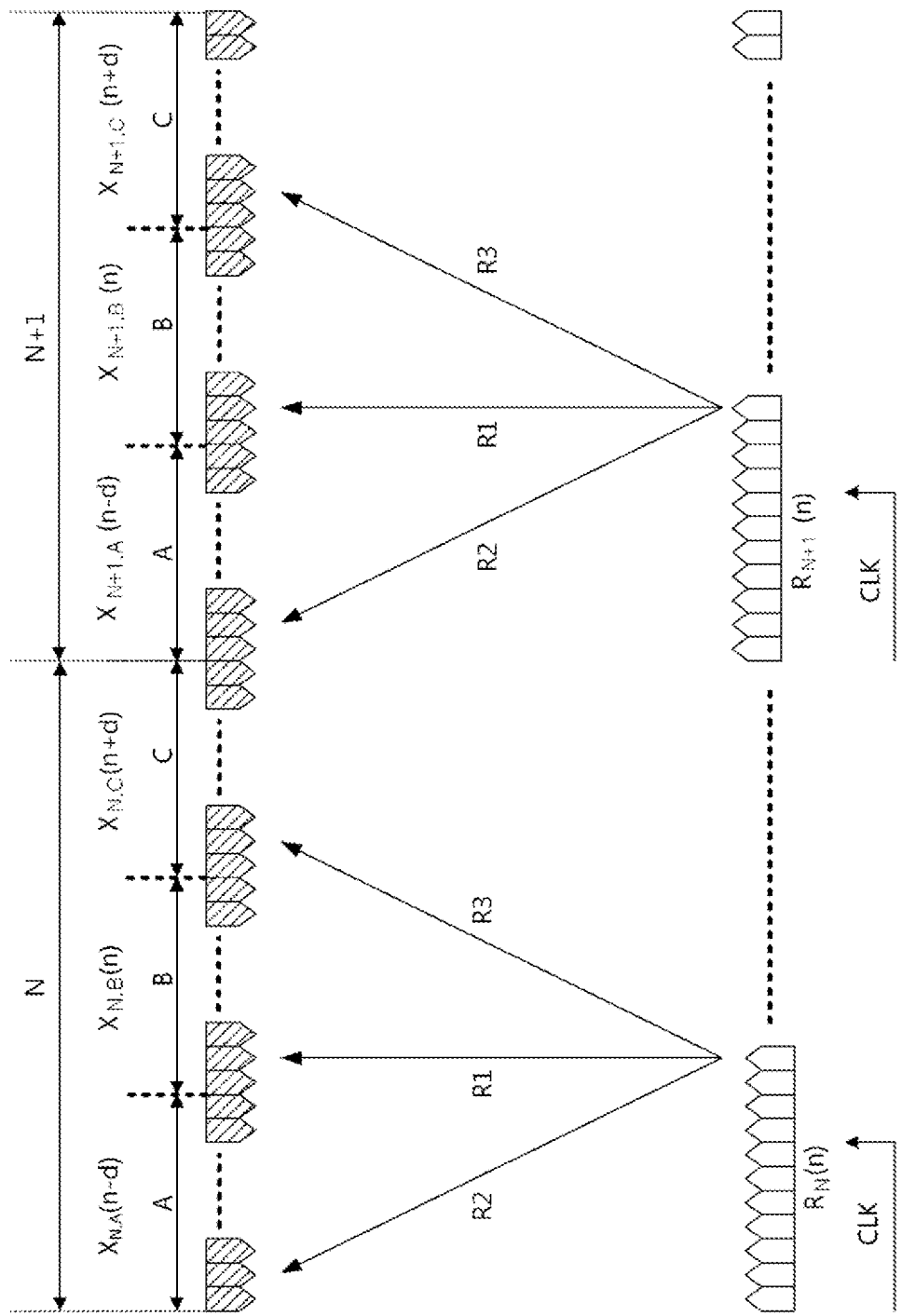
FIG. 19 is a view of the multi-touch screen device in accordance with the third embodiment of the present invention for illustrating a principle of interlocking receiving unit modules in adjacent receiving unit module groups.
Figure 20:
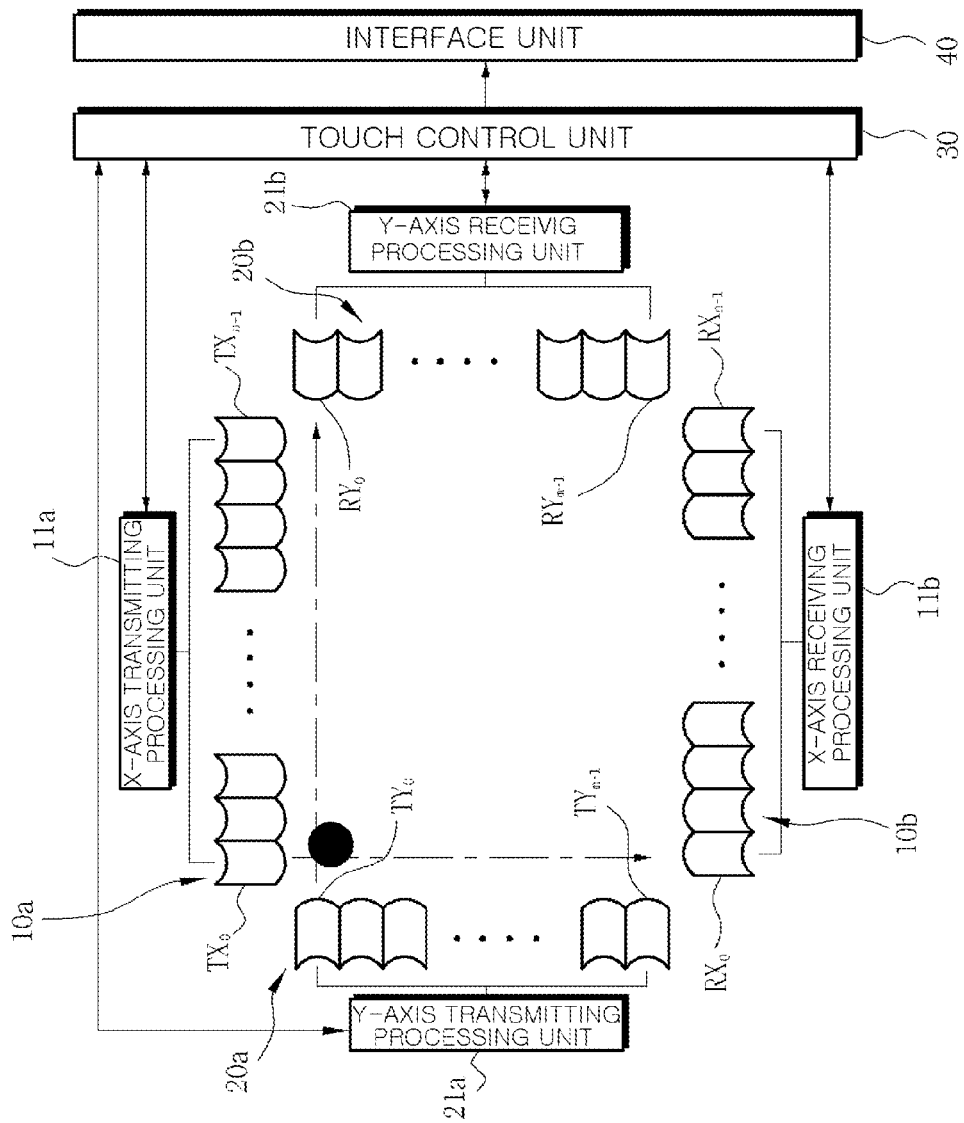
FIG. 20 is a view illustrating a conventional multi-touch screen device.

FIG. 19 is a view of a multi-touch screen device for illustrating a principle of interlocking receiving unit modules in adjacent receiving unit module groups in accordance with the third embodiment of the present invention.

As exemplarily shown in FIG. 19, since, among touch measurement signals transmitted from touch measurement signal transmitting units of adjacent transmitting unit groups 1330 and 1340, the touch measurement signals at an acute angle may be received by the touch measurement signal reception units in receiving unit modules 1311~1313 and 1321~1323 of the adjacent receiving unit module groups 1310 and 1320, some receiving unit modules of the receiving unit module groups 1310 and 1320 may at least receive touch measurement signals regardless of from which touch measurement signal transmitting units of the transmitting groups 1330 and 1340 touch measurement signals are transmitted.

Although the above-described embodiment describes that receiving units are classified into three groups, A, B, and C, if a designated number of the receiving units is classified into groups, one receiving unit module group may include N receiving unit modules.

Further, although the above-described embodiment describes 2 receiving unit module groups, 2 or more receiving module groups may be formed according to configuration of the multi-touch screen device.

In more detail, receiving units may be classified into M receiving unit module groups, one receiving unit module group may include N receiving unit modules, and one receiving unit module may include C receiving units. Thereby, on the assumption that the total number of the receiving units on the x-axis is X, an equation X=N×M×C is formed.

INDUSTRIAL APPLICABILITY

The present invention may be applicable to fields related to displays, such as a mobile terminal, a monitor, a TV, a game machine, etc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A multi-touch screen device comprising:
   x-axis transmitting modules including transmitting elements transmitting touch measurement signals radially to receiving elements being opposite to the transmitting elements;
   x-axis receiving modules including the receiving elements sequentially receiving the touch measurement signals transmitted by the transmitting elements at right and oblique angles;
   a controller calculating x and y coordinates of touch areas using only the touch measurement signals received by the x-axis receiving modules; and
   a touch panel receiving touch input from users,
   wherein the controller calculates the y coordinate of the touch area using Equation $y(n)=f(x_r(n)-x_0(n))$ or Equation $y(n)=G\times(x_r(n)-x_0(n))$, and
   wherein $y(n)$ represents virtual y-axis orthogonal coordinates calculated from the x-axis coordinates measured from right and oblique angle touch measurement signals, $x_0(n)$ represents x-axis orthogonal coordinates of an $n^{th}$ object measured using the right angle touch measurement signal, $x_r(n)$ represents x-axis oblique coordinates of the $n^{th}$ object measured using the oblique angle touch measurement signal, when the oblique angle touch measurement signal is scanned at an obtuse angle then $x_r \geq x_0$ and when the oblique angle touch measurement signal is scanned at an acute angle then $x_0 \geq x_r$, wherein G is a scaling constant determined by an equation $w=G\times(x_e(n)-x_0(n))$, where W is a virtual logical resolution value of coordinates $x_e(n)$ corresponding the last point of touch due to the touch area of the maximum coordinate point occurring when the oblique angle transmission signal is generated, and
   wherein, if the kth receiving or transmitting element fails, the measurement value of the kth touch measurement signal is replaced with the measurement value of the k−1th touch measurement signal.

2. The multi-touch screen device according to claim 1, wherein the controller calculates the x coordinate of the touch area based on a signal received by the x-axis receiving module corresponding to the touch area obstructing the path of the touch measurement signal transmitted at the right angle from the x-axis transmitting module and calculates the y coordinate of the touch area based on a signal received by the x-axis receiving module corresponding to the touch area obstructing the path of the touch measurement signal transmitted at the oblique angle from the x-axis transmitting module.

3. The multi-touch screen device according to claim 2, wherein the controller calculates the x coordinates [$x_o(n)$, $x_r(n)$] of the touch area obstructing the paths of the touch measurement signals transmitted at the right and oblique angles based on touch measurement signal measurement values acquired by normalizing the magnitudes of the received touch measurement signals.

4. The multi-touch screen device according to claim 3, wherein, among the touch signal measurement values, in case of a value greater than a first reference value $T_{lower}$, it is judged that there is an obstruction to the path of the touch measurement signal and the x coordinates [$x_o(n)$, $x_r(n)$] of the touch areas are determined.

5. The multi-touch screen device according to claim 1, wherein the receiving elements and the transmitting elements are alternately arranged on the same axis and perform scanning such that the receiving element on one side and the transmitting element on the other side are opposite to each other and thus form one pair.

6. The multi-touch screen device according to claim 1, wherein the receiving elements and the transmitting elements transmit touch signals alternately with adjacent receiving elements and transmitting elements by a designated time interval.

* * * * *